(12) United States Patent
Kawai

(10) Patent No.: US 7,419,101 B2
(45) Date of Patent: Sep. 2, 2008

(54) PHYSICAL DISTRIBUTION MANAGEMENT APPARATUS, PHYSICAL DISTRIBUTION MANAGEMENT PALLET AND PHYSICAL DISTRIBUTION MANAGEMENT SYSTEM

(75) Inventor: Wakahiro Kawai, Kyoto (JP)

(73) Assignee: Omron Corporation, Kyoto (JP)

( * ) Notice: Subject to any disclaimer, the term of this patent is extended or adjusted under 35 U.S.C. 154(b) by 214 days.

(21) Appl. No.: 11/222,739

(22) Filed: Sep. 12, 2005

(65) Prior Publication Data

US 2006/0054693 A1   Mar. 16, 2006

(30) Foreign Application Priority Data

Sep. 13, 2004 (JP) .......................... P. 2004-265341
Sep. 21, 2004 (JP) .......................... P. 2004-273445

(51) Int. Cl.
*G06K 19/06* (2006.01)
(52) U.S. Cl. ...................................... 235/492; 235/486
(58) Field of Classification Search ................ 235/441, 235/435, 383, 492, 486, 375
See application file for complete search history.

(56) References Cited

U.S. PATENT DOCUMENTS

| 5,959,568 | A | 9/1999 | Woolley |
| 6,661,339 | B2 | 12/2003 | Muirhead |
| 6,718,888 | B2 | 4/2004 | Muirhead |
| 6,943,678 | B2 | 9/2005 | Muirhead |
| 2002/0030597 | A1 | 3/2002 | Muirhead |
| 2004/0056779 | A1* | 3/2004 | Rast ........................... 340/985 |
| 2004/0082296 | A1 | 4/2004 | Twitchell, Jr. |
| 2006/0038684 | A1* | 2/2006 | Lahiri ..................... 340/572.1 |
| 2006/0163350 | A1* | 7/2006 | Melton et al. ............... 235/435 |
| 2006/0243174 | A1 | 11/2006 | Muirhead |
| 2007/0083439 | A1* | 4/2007 | Petrovich ..................... 705/26 |
| 2007/0084919 | A1* | 4/2007 | Petrovich .................... 235/383 |
| 2007/0089773 | A1 | 4/2007 | Koester et al. |

FOREIGN PATENT DOCUMENTS

| EP | 0 727 360 A2 | 8/1996 |
| JP | 2002-154618 | 5/2002 |
| WO | WO 03/073201 A2 | 9/2003 |

* cited by examiner

Primary Examiner—Thien M Le
(74) Attorney, Agent, or Firm—Dickstein Shapiro LLP

(57) ABSTRACT

The physical distribution management apparatus comprises a non-contact communication section for communicating out of contact with a non-contact IC tag, an information acquisition section for acquiring the information concerning a situation where it is placed, a control section for writing the information acquired by the information acquisition section into a prescribed storage section, and a portable power source section for supplying an electric power to each of the sections.

23 Claims, 18 Drawing Sheets

FIG. 11

NON-CONTACT IC TAG DATA

| RECORD NO. | POSITION | TIME | TEMPERATURE | HUMIDITY | IMPACT | PALLET NO. |
|---|---|---|---|---|---|---|
| 1 | LATITUDE-LONGITUDE | DAY/HOUR/MINUTE | +25C° | 70% | | 123-456 |
| 2 | LATITUDE-LONGITUDE | DAY/HOUR/MINUTE | -10C° | --- | | 123-456 |
| 3 | LATITUDE-LONGITUDE | DAY/HOUR/MINUTE | -10C° | --- | | 123-456 |
| 4 | IN-WAREHOUSE ADDRESS | DAY/HOUR/MINUTE | -10C° | --- | | 100-1234 |
| 5 | IN-WAREHOUSE ADDRESS | DAY/HOUR/MINUTE | -10C° | --- | | 100-1234 |
| 6 | IN-WAREHOUSE ADDRESS | DAY/HOUR/MINUTE | +10C° | 50% | × | 100-1234 |
| 7 | LATITUDE-LONGITUDE | DAY/HOUR/MINUTE | -10C° | --- | | 100-1234 |
| 8 | LATITUDE-LONGITUDE | DAY/HOUR/MINUTE | +30C° | 80% | | 123-456 |
| ... | ... | ... | ... | ... | ... | ... |

FIG. 12

CONTROLLER DATA

| RECORD NO. | POSITION | TIME | TEMPERATURE | HUMIDITY | IMPACT | TAG ID (OR PRODUCT NUMBER, PRODUCT NAME, ETC.) |
|---|---|---|---|---|---|---|
| 1 | LATITUDE-LONGITUDE | DAY/HOUR/MINUTE | +25C° | 70% | | OO-OOO, OO-OOO, OO-OOO, OO-OOO, AB-CDE, OO-OOO |
| 2 | LATITUDE-LONGITUDE | DAY/HOUR/MINUTE | -10C° | --- | | OO-OOO, OO-OOO, OO-OOO, OO-OOO, AB-CDE, OO-OOO |
| 3 | LATITUDE-LONGITUDE | DAY/HOUR/MINUTE | RECORD ACCESS FROM PORTABLE TELEPHONE ||||
| 4 | LATITUDE-LONGITUDE | DAY/HOUR/MINUTE | -10C° | --- | | OO-OOO, OO-OOO, OO-OOO, OO-OOO, AB-CDE, OO-OOO |
| 5 | IN-WAREHOUSE ADDRESS | DAY/HOUR/MINUTE | -10C° | --- | | OO-OOO, OO-OOO, OO-OOO |
| 6 | IN-WAREHOUSE ADDRESS | DAY/HOUR/MINUTE | -10C° | --- | | OO-OOO, OO-OOO, OO-OOO |
| 7 | IN-WAREHOUSE ADDRESS | DAY/HOUR/MINUTE | -10C° | --- | | OO-OOO, OO-OOO, OO-OOO, XX-XXX, XX-XXX |
| 8 | IN-WAREHOUSE ADDRESS | DAY/HOUR/MINUTE | -10C° | --- | | OO-OOO, OO-OOO, OO-OOO, XX-XXX, XX-XXX |
| 9 | LATITUDE-LONGITUDE | DAY/HOUR/MINUTE | +30C° | 80% | | OO-OOO, OO-OOO, OO-OOO, XX-XXX, AB-CDE |
| ... | ... | ... | ... | ... | ... | ... |

US 7,419,101 B2

PHYSICAL DISTRIBUTION MANAGEMENT APPARATUS, PHYSICAL DISTRIBUTION MANAGEMENT PALLET AND PHYSICAL DISTRIBUTION MANAGEMENT SYSTEM

BACKGROUND OF THE INVENTION

1. Technical Field

This invention relates to a physical distribution management apparatus, a physical distribution management pallet and a physical distribution management system for managing the physical distribution with a non-contact IC tag attached to an article, for instance.

2. Related Art

To advance the automation of physical distribution, it is important to enable the machine to read the content of a slip stuck on an individual article.

In the related art, to fulfil this purpose, it is common practice that a bar code label corresponding to the content is stuck on an individual slip.

However, it took time to read the bar code label with a so-called bar-code reader, because it is requisite to have a definite distance and directional association between them at high accuracy, impeding the smooth physical distribution. In addition, because the volume of information that was able to be inputted to the bar code was a little, the range of management of distribution was limited to the narrow district.

Recently, a non-contact IC tag that is readable out of contact with electromagnetic has been employed. This non-contact IC tag is read without many distance and direction restrictions because of the use of the electromagnetic radiation as the reading medium. The content of the non-contact IC tag can be surely read easily.

Moreover, individual information on goods for management can be memorized by a large capacity in the IC within this non-contact IC tag. Therefore, this individual information may be utilized as security information to specify the individual.

Usually, when such non-contact IC tag is used with the distribution management system, information within the non-contact IC tag is read by a conveyer type reader device shown in FIG. 16 or a gate type reader device shown in FIG. 17.

More particularly, articles 100, 200 etc. on which non-contact IC tag 101,201 is stuck are carried by conveyer 120 or forklift 220, and passed between reader device 110, 111 (FIG. 16) and reader device 210, 211 (FIG. 17).

At this time, data within the non-contact IC tag 101, 201 is read by above-mentioned reader device 210, 211, and the data is transmitted to a computer 130, 230 through the connected line 112, 212.

The computer 130, 230 is connected to a network in the form as shown in a system configuration diagram of FIG. 18 to compose the distribution management system, whereby the data read by the reader device 210,211 and transmitted to the computer is employed to manage the entire distribution process.

However, the above-mentioned conveyer type reader 110, 111 or the gate type reader 210 and 211 confirms the situation of the article in point that passed over the communication area of the reader device, but cannot manage the state of the article after the reader device is passed until the next reader device is passed.

That is, there is a problem that egress and ingress of the article is grasped, but it is ineffectual for the management of whereabouts and keeping situation of the article in stock, the pursuit of transportation route during transportation, and the prevention of the mistake or misdelivery of the article.

As a measure for solving this problem, a physical distribution management system has been proposed in which data within the non-contact IC tag attached on the article is memorized as cargo information in a wireless communication device mounted on the stand such as a palette that piles up the articles when the wireless communication device is passed through the gate type reader device (refer to JP-A-2002-154618).

This physical distribution management system manages two or more different articles in a unit of palette by using cargo information on each palette within the wireless communication device for the physical distribution management. The communication range of several meters is enabled by using Blue Tooth for the wireless communication device to manage the whereabouts of the article and pursue the transportation route of the article.

However, there was a problem that the management information concerning the keeping situation of the cargo on the palette, extracting each article or adding other articles, after passing through the gate type reader device, can not be grasped.

Also, it was difficult to manage the stock when the articles are mixed in transportation or temporarily stored on the way, and manage the whereabouts outdoors or in a vast warehouse.

Furthermore, since it is required to pass the article through the conveyer type reader or the gate type reader when carrying in or out the article, the route of carrying in or out was limited to have the cargo stagnant in front of each reader device.

On the other hand, as a general use method of the non-contact IC tag, data can be written in the memory within the non-contact IC tag in each distribution base, and this data be employed for the distribution passage management of the article.

However, the related-art method using the conveyer type reader or gate type reader has a problem that the data inputted in each base can be freely changed, and is less reliable as the management data.

In addition, in the above-mentioned related-art physical distribution management system, there is a problem that a complete distribution management system cannot be constructed unless all traders who relate to each process invest the reader device, and the data of all the traders are connected via a network as shown in FIG. 18.

Accordingly, there was a problem of delaying the introduction of the physical distribution system with the non-contact IC tag, because the trader bears excessive cost if a big effect of the introduction of the physical distribution system using the non-contact IC tag was not expected.

SUMMARY OF THE INVENTION

In the light of the above-mentioned problems, it is an object of the invention to provide a physical distribution management apparatus, a physical distribution management pallet and a physical distribution management system in which the physical distribution management can be made at low cost without taking the trouble.

This invention provides a physical distribution management apparatus comprising a non-contact communication section for communicating out of contact with a non-contact IC tag, an information acquisition section for acquiring the information concerning a situation where it is placed, a control section for writing the information acquired by the information acquisition section into at least one storage section, and a portable power source section for supplying an electric power to each of the sections.

The prescribed storage section may be a storage section provided for the non-contact IC tag, a storage section provided in the physical distribution management apparatus, or other storage section.

The portable power source section may be a battery or dry cell, or a portable power source. The battery or dry cell is desirably chargeable, but may be disposable if it is not chargeable.

With the above constitution, the information concerning the placed situation, such as position, temperature, humidity and impact, for example, can be written into the non-contact IC tag or the physical distribution management apparatus to make the physical distribution management.

Accordingly, the situation where the non-contact IC tag is placed, or the situation where the article associated with the non-contact IC tag is placed can be traced or proven later.

Further, since this physical distribution management apparatus is driven by the portable power source section, the information can be written without selecting the place. Accordingly, the conveyance pallet or container may be employed as the physical distribution management apparatus, or the physical distribution management apparatus may be installed in a state where the articles are laid on the pallet or container.

Since the physical distribution management apparatus can be circulated along with the articles to which the non-contact IC tag is pasted and enables the communication with the non-contact IC tag, it is unnecessary that the article is passed through the gate type reader device. Accordingly, the data within the non-contact IC tag can be read without taking the trouble.

The timing at which the control section performs a predetermined process, such as the timing of communicating with the non-contact IC tag, the information acquisition timing of enabling the information acquisition section to acquire the information, or the writing timing of writing the information acquired by the information acquisition section, occurs appropriately when the external apparatus communication section receives an execution instruction from the external apparatus, when the time recognition section recognizes a predetermined time or elapse of time, when the environmental information acquisition section acquires the predetermined environmental information, when the positional information acquisition section detects the movement of a certain distance, or when an execution instruction is received from a push button or touch panel.

In a form of this invention, the physical distribution management apparatus may further comprise a positional information acquisition section for acquiring the current positional information as the information acquisition section.

The positional information acquisition section is constituted of a GPS apparatus for acquiring the positional information such as latitude and longitude, employing a GPS (Global Positioning System) Also, it has the non-contact IC tag reader for acquiring the positional information out of contact from the non-contact IC tag disposed for each section and storing the positional information of its section.

With the above constitution, the location of the physical distribution management apparatus can be designated and written into the storage section.

Accordingly, if the positional information is read from the storage section, it is discriminated where the non-contact IC tag or the article associated with the non-contact IC tag is located, or was located. Thereby, the article circulation process can be traced or proven later.

In another form of the invention, the physical distribution management apparatus may further comprise an environmental information acquisition section for acquiring the current environmental information as the information acquisition section.

The environmental information acquisition section may be one or more of temperature information acquisition sections for acquiring the temperature information of the place where it exists, a humidity information acquisition section for acquiring the humidity information of the place where it exists, and the impact information acquisition section for acquiring the impact information of the place where it exists.

Thereby, the environmental information (temperature, humidity, impact) concerning the environment where the non-contact IC tag or the article associated with the non-contact IC tag is placed can be written into the storage section.

In another form of the invention, the control section may write the information acquired by the information acquisition section into the non-contact IC tag, and write the information concerning the non-contact IC tag and the information acquired by the information acquisition section into the storage section equipped for itself.

Thereby, a part or all the information that is the same as the information written into the non-contact IC tag can be stored into the storage section of the physical distribution management apparatus. Accordingly, when the information written into the non-contact IC tag is falsified, a falsification can be detected, whereby the correctness of the information within the non-contact IC tag can be proved.

Also, when it is desired that the information written into the non-contact IC tag is acquired, the information can be read from the storage section without communication with the non-contact IC tag. Accordingly, when a plurality of non-contact IC tags exist within the communication range of the physical distribution management apparatus, and all the information of the non-contact IC tags are desired to know, the information of the non-contact IC tags can be acquired in a short time from the storage section.

Also, in another form of the invention, the physical distribution management apparatus may further comprise a time recognition section for recognizing the time, in which the time at which the information is acquired is written along with the information.

The time recognition section may be a timer for measuring the time, or a standard wave receiver for receiving the standard wave transmitted to be used for the electric wave clock.

The time is expressed in one or more of year, month, day, hour, minute and second, but desirably at least in day, time and minute.

With the above constitution, the information can be written along with the time, and the information acquisition time can be recorded. Accordingly, the information of position, temperature, humidity and impact at a certain time can be traced or proved later.

In another form of the invention, the physical distribution management apparatus may further comprise a time recognition section for recognizing the time, in which the non-contact communication section communicates with the non-contact IC tag in accordance with the preset time settings.

Thereby, the physical distribution management for the non-contact IC tag can be made through periodical communications in such a way as to communicate with the non-contact IC tag at the scheduled time such as hour and hour everyday, or to communicate with the non-contact IC tag at a regular interval every five minutes.

If the management interval is shorter, the taking-out time and the taking-out article (or non-contact IC tag) can be specified, when the non-contact IC tag is taken out with the article. Conversely, when the article associated with the non-contact IC tag (or non-contact IC tag) is carried in, the carrying-in time and the carrying-in article (or non-contact IC tag) can be specified.

In another form of the invention, the physical distribution management apparatus may further comprise an external apparatus communication section for communicating with an external apparatus through a communication line, apart from the non-contact communication section, in which when there is an access from the external apparatus, the physical distribution management apparatus performs a predetermined process based on an instruction signal received from the external apparatus, and enables the external apparatus communication section to transmit the result of executing the process to the external apparatus.

The communication line may be a mobile communication network useful for the communication of a mobile unit such as portable telephone or PDA, the Internet, the Intranet, or other communicable lines. The communication line is preferably for wide area such as the mobile communication network or the Internet.

The external apparatus may be a portable information terminal such as a portable telephone set, PDA or note-type personal computer, or a stationary information terminal such as a desktop type personal computer.

The predetermined process may be performed upon an instruction signal from the external apparatus, such as a tag information reading process for enabling the non-contact communication section to read the information written in the non-contact IC tag, an accumulated information reading process for reading the information from the storage section where the information written in the non-contact IC tag is accumulated, or an information acquisition process for acquiring the information from the acquisition section.

With the above constitution, the access to the physical distribution management apparatus can be made from the external apparatus, whereby the access to the physical distribution management apparatus is enabled from the remote site. Also, even if the user does not have the reader/writer device that can communicate with the non-contact IC tag, the access to the physical distribution management apparatus can be made from the external apparatus, as needed, to communicate with the non-contact IC tag.

In another form of the invention, the ID information of a consignee may be read from the non-contact IC tag possessed by the consignee, and the ID information may be written into the storage section.

Thereby, the information concerning the consignee can be written into the non-contact IC tag. Accordingly, the consignee receiving the article in the middle of the circulation stage can be traced or proven later.

In another form of the invention, the receiving time acquired by the time recognition section and the information acquired by the information acquisition section may be written along with the ID information of the consignee into the storage section or non-contact IC tag.

Thereby, the consignee, the receiving time and the information acquisition time can be written. Accordingly, the information can be employed for proving the environment in the circulation process of the article with non-contact IC tag and the guarantee of the quality of the article.

This invention also provides a physical distribution conveyance member incorporating the physical distribution management apparatus, comprising a fork insertion portion for inserting a fork of a forklift from a lateral face, wherein each of the section is kept away from the fork insertion portion.

The article conveyance member may be the member for conveying the article loaded thereon, such as the pallet on which the articles are laid, or the container for containing the articles.

With the above constitution, the article conveyance member such as pallet or container often employed for conveying the article can communicate with the non-contact IC tag attached to the article.

Since each section of the physical distribution management apparatus is kept away from the fork insertion portion, the failure is prevented and the useful life is lengthened without impairing the communication function with the non-contact IC tag, even if the article conveyance member is loaded or unloaded by the forklift in the physical distribution process, or the place is changed.

Also, the invention provides a physical distribution management system comprising a communication line for enabling the communications, an external apparatus having a communication section for communicating via the communication line, and a physical distribution management apparatus having an external apparatus communication section for communicating with the external apparatus via the communication line, a non-contact communication section for communicating out of contact with a non-contact IC tag, a control section for performing various control processes, and a portable power source section for supplying an electric power to each of the sections, wherein when there is an access from the external apparatus, the physical distribution management apparatus performs a prescribed process based on an instruction signal received from the external apparatus, and enables the external apparatus communication section to transmit the tag information concerning the non-contact IC tag as the result of executing the process to the external apparatus.

Thereby, the access to the physical distribution management apparatus is made from the external apparatus to manage the non-contact IC tag or the article associated with the non-contact IC tag in a range where the physical distribution management apparatus is communicable.

In another form of the invention, the physical distribution management apparatus may comprise an information acquisition section for acquiring the information concerning a situation where it is placed, in which the information acquired by the information acquisition section is transmitted when the tag information is transmitted to the external apparatus by the external apparatus communication section.

Thereby, the access to the physical distribution management apparatus is made from the external apparatus to confirm the state (e.g., position, temperature, humidity, impact, etc.) of the non-contact IC tag or the article associated with the non-contact IC tag in a range where the physical distribution management apparatus is communicable.

In another form of the invention, the physical distribution management system may further comprise a charging section for charging the external apparatus for an access to the physical distribution management apparatus. The charging section may decide the charged amount by measuring the number of accesses from the external apparatus, or charge a fixed amount for every predetermined period in a unit of month or year.

With the above constitution, the physical distribution management apparatus may be rented with or without charge and the use of the physical distribution management apparatus may be charged. Accordingly, the user gains access to the physical distribution management apparatus, employing the external apparatus even without possessing the physical distribution management apparatus, to manage the non-contact IC tag or the article associated with the non-contact IC tag.

With this invention, it is possible to provide the physical distribution management apparatus and the physical distribution management system in which the minute physical distribution management is enabled at low cost without taking the trouble.

BRIEF DESCRIPTION OF THE DRAWINGS

FIG. 11 is a data explanatory diagram for a memory within a non-contact IC tag.

FIG. 12 is a data explanatory diagram for a memory within the controller.

DETAILED DESCRIPTION OF THE INVENTION

Figure 1:
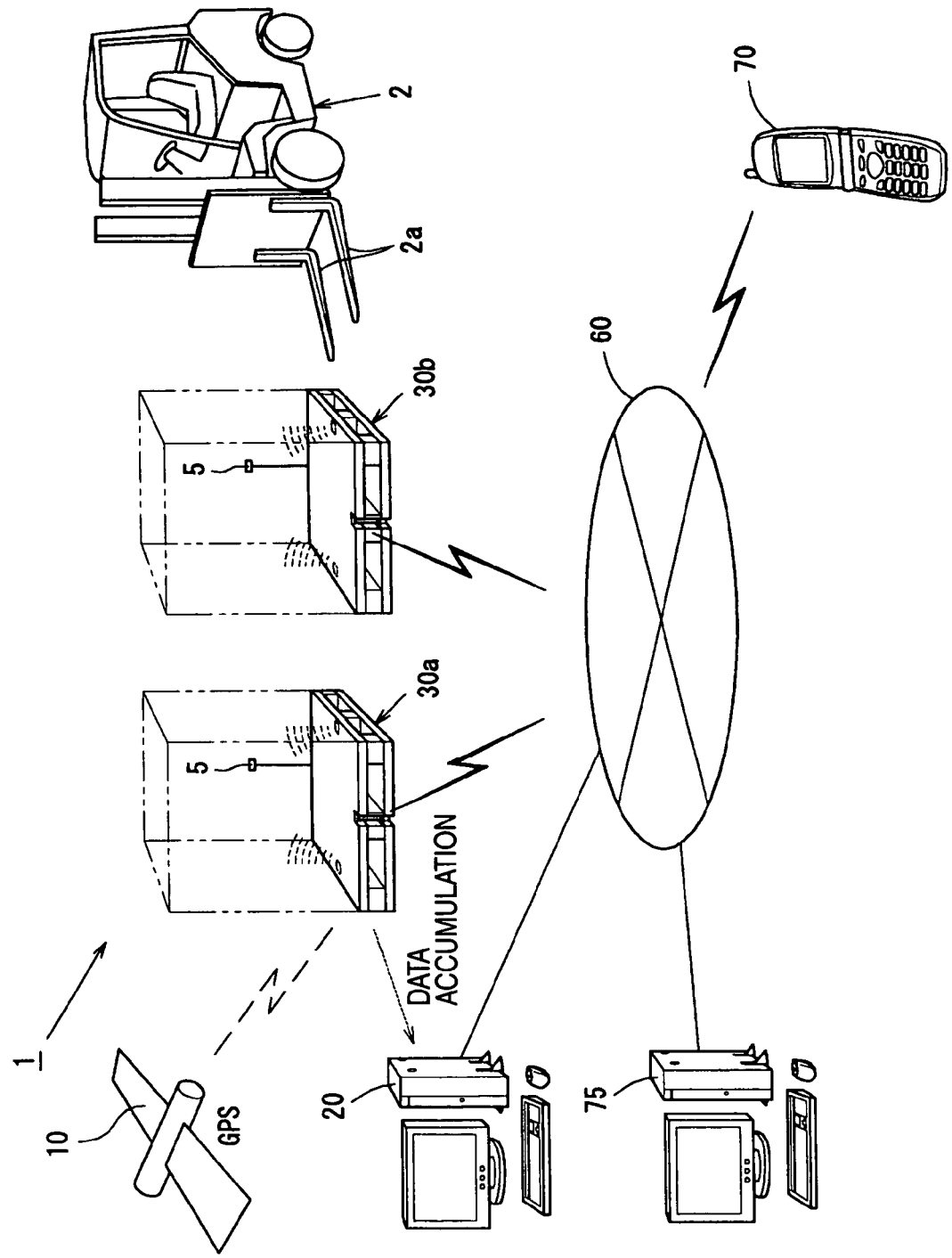
FIG. 1 is a system configuration diagram of a physical distribution management system.

One embodiment of the present invention will be described below with reference to the drawings.

First of all, the system configuration of a physical distribution management system 1 will be described below with reference to FIG. 1 which is a system block diagram.

The physical distribution management system 1 comprises a GPS satellite 10, an accumulation server 20, a plurality of management pallets 30 (30a, 30b . . . ), a mobile communication network 60, a portable telephone 70 and a charging server 75.

The GPS satellite 10 communicates with a GPS apparatus contained in a management pallet 30, measures the position of the GPS apparatus and transmits the positional information such as longitude and latitude to the GPS apparatus.

The accumulation server 20 accumulates the data by acquiring and recording the data of physical distribution from the management pallet 30 that has finished one series of physical distribution processes. Also, the accumulation server 20 is connected to the mobile communication network 60 and can be accessed from the portable telephone 70 or other external terminals.

The accumulation server 20 may be connected to any communication network such as the Internet other than the mobile communication network 60, and accessed from other external terminals such as a personal computer. Also, the accumulation server 20 may not be connected to the communication network at all.

The accumulation server 20 may be placed in a dealer involved in the physical distribution such as a manufacturer or distributor for the article, or the third party monitoring the physical distribution situation, according to the purposes.

The management pallet 30 is loaded with a plurality of articles and transported by a forklift 2. It internally comprises a tag reader/writer for communicating out of contact with a non-contact IC tag (RF-ID tag). Further, it comprises a sensing device acquiring the environmental data such as temperature, humidity and impact, a mobile antenna for enabling the packet communication with the portable telephone 70 via the mobile communication network 60, and a GPS apparatus for acquiring the positional information from the GPS satellite 10.

Also, the management pallet 30 is installed within a warehouse in an illustrated state, and an in-warehouse position transmission tag 5 is disposed for each section in its installed site. This in-warehouse position transmission tag 5 is the non-contact IC tag storing the data indicating the section, which can be read by the IC tag reader/writer provided in the management pallet 30.

The mobile communication network 60 is provided by a carrier of the portable telephone 70 that is a mobile unit, and enables the portable telephone 70 to peruse a Web page or transmit or receive an electronic mail.

The mobile communication network 60 is also connected to the Internet (public line), not shown, and enables the communication not only with an apparatus (portable telephone 70, data communication card, etc.) having the same mobile antenna as the portable telephone 70, but also with an information processing apparatus such as a personal computer connected to the Internet.

The portable telephone 70 is a portable information terminal having a data communication function of enabling the perusal of a Web page via the mobile communication network 60, and can gain access to the management pallet 30 via the mobile communication network 60.

The charging server 75 charges when the portable telephone 70 gains access via the mobile communication network 60 to the management pallet 30, and charges the access to the Web contents usable by the portable telephone 70.

The access to the management pallet 30 is charged like the access to a chargeable home page for portable telephone by this charging server 75, in which the user can select, as a charging system, a constant rate system of fixed monthly rate or a measured rate system according to the number of accesses.

With the above system configuration, the management pallet 30 can acquire various kinds of data, to which the portable telephone 70 can gain access.

Figure 2:
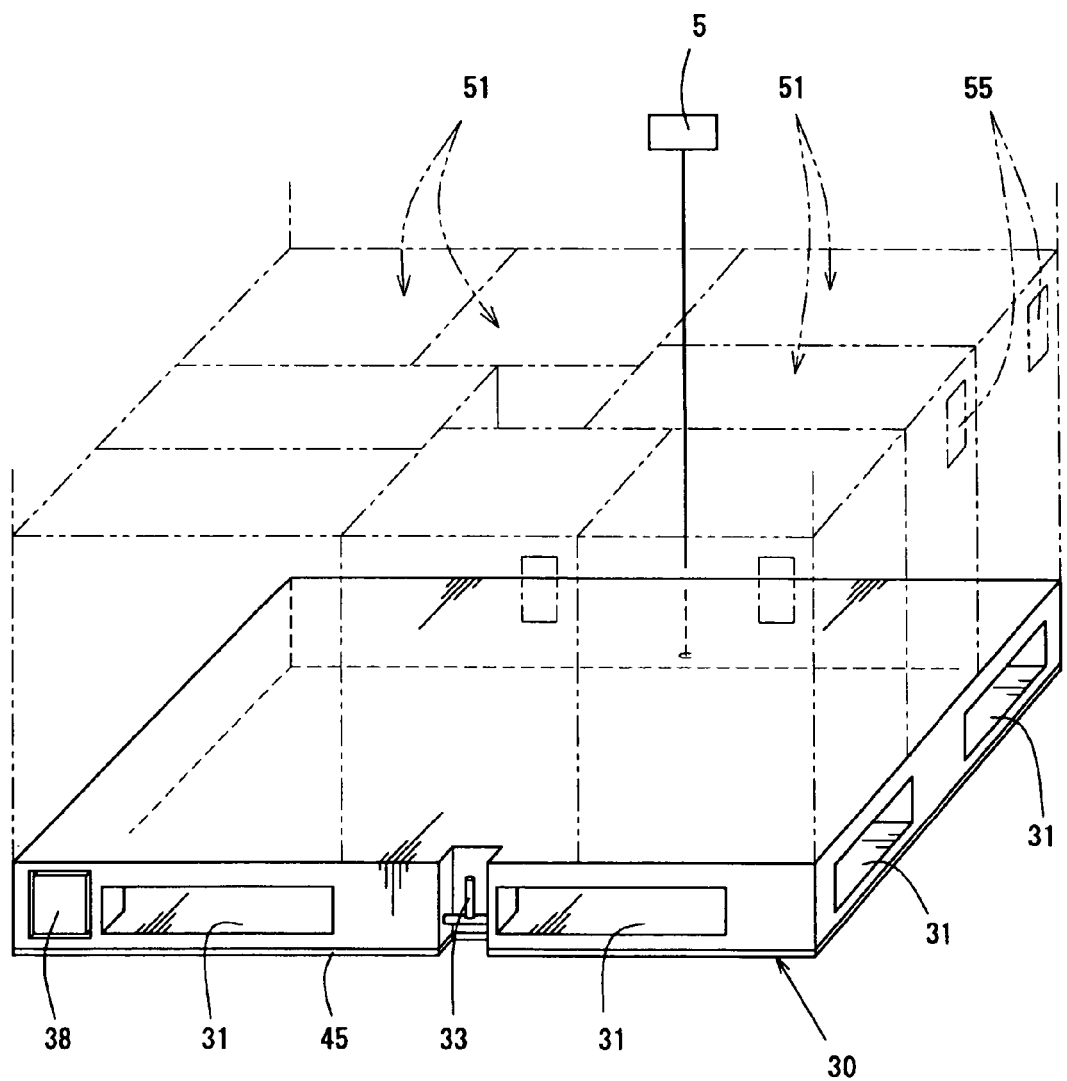
FIG. 2 is a perspective view of a management pallet.
Figure 3:
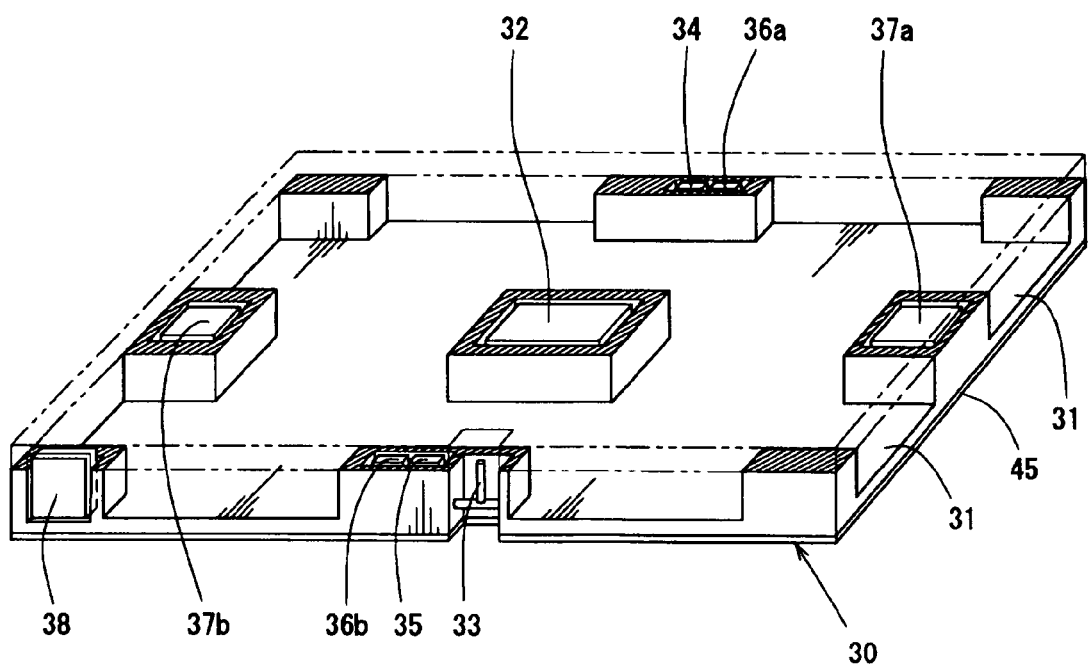
FIG. 3 is a perspective cross-sectional view of the management pallet.
Figure 4:
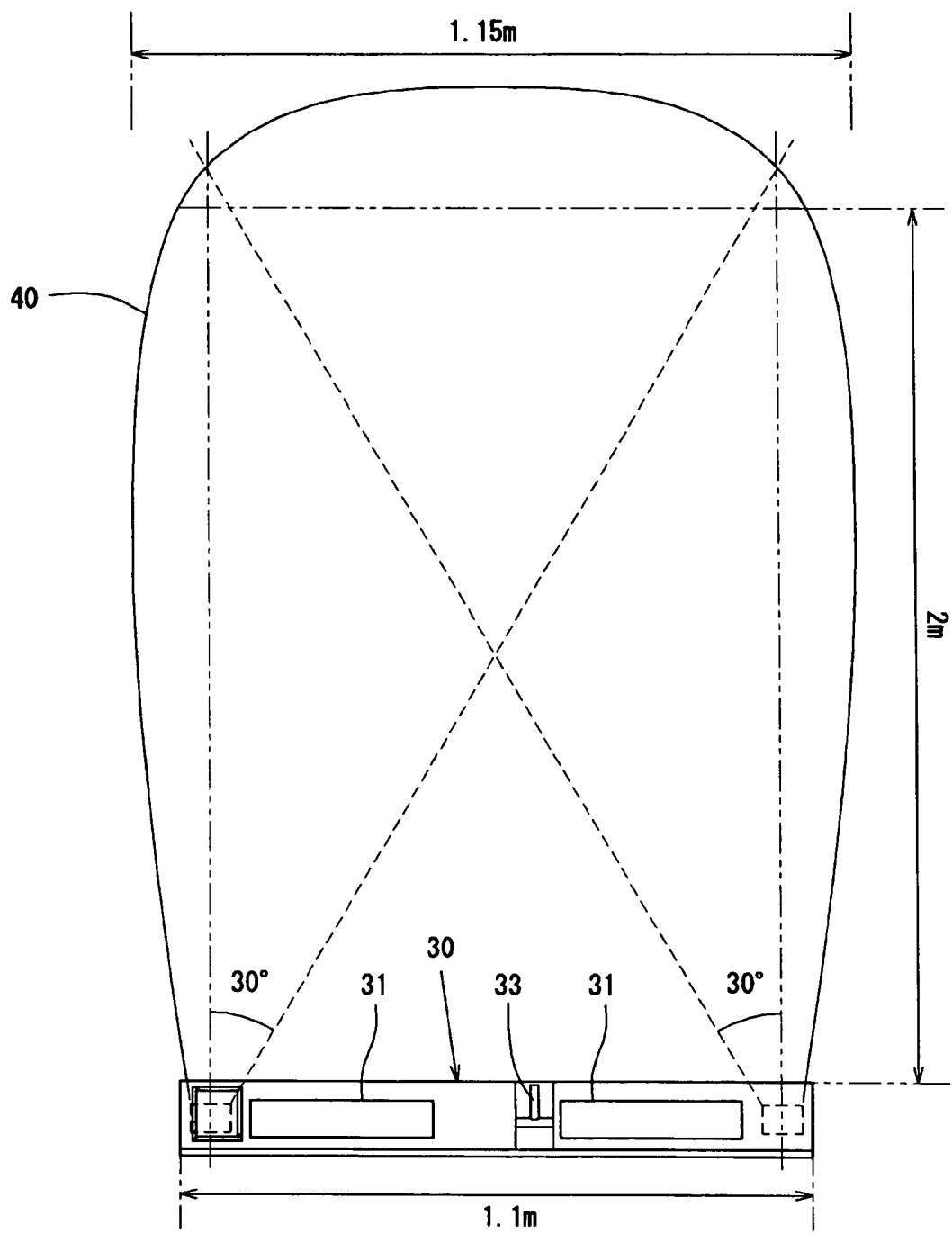
FIG. 4 is a front view for explaining a non-contact communication area of the management pallet.

Referring to a perspective view as shown in FIG. 2, a perspective cross-sectional view as shown in FIG. 3 and an explanatory view for the non-contact communication area as shown in FIG. 4, the configuration of the management pallet 30 will be described below.

The management pallet 30 is loaded with a number of articles 51 for transportation and transported by the forklift 2

(FIG. 1). It has the shape of a regular square of about 1 m×1 m in plan view with a predetermined thickness (e.g., about 10 cm).

Herein, one non-contact IC tag 55 is attached to one article 51, in which the article 51 and the non-contact IC tag 55 are placed in the one-to-one relation. Accordingly, the non-contact IC tags 55 exist by the number of articles 51.

For instance, a plurality of goods may be packaged in a predetermined unit, and the non-contact IC tag 55 may be attached to one package as one article. In this case, the data concerning the number of goods may be stored in the non-contact IC tag 55.

On each of the front, back, left and right side faces of the management pallet 30, two fork bores 31 penetrating through the inside to the opposite side face are provided to insert the fork 2a (FIG. 1) of the forklift 2 (FIG. 1). Thereby, the fork 2a of the forklift 2 can be inserted from any of four side faces to lift and transport the management pallet 30.

This management pallet 30 is formed of hard resin material. It may be formed of other materials, such as wood, capable of supporting the article 51 to be laid.

A battery 38 is removably mounted at one corner portion of the management pallet 30. Since the battery 38 is removably mounted on the periphery of the management pallet 30 in this way, the battery 38 can be dismounted intact from the heavy management pallet 30 loaded with a number of articles 51, and easily charged.

Also, a groove is provided in the center of the front face of the management pallet 30 having the battery 38, and a mobile antenna 33 for enabling the long distance communication by radio with a base station (not shown) of the mobile communication network 60 (FIG. 1) is provided within the groove.

In this way, the mobile antenna 33 is disposed at a position on the periphery of the management pallet 30 less affected by the loaded articles 51 and away from four corners which are more subject to a mechanical stress, whereby the communication is stabilized and the trouble is prevented.

An electromagnetic shield member 45 such as a net formed from aluminum foil or metallic fiber is totally covered on the bottom face of the management pallet 30. Thereby, even if the management pallets 30 loaded with the articles 51 are stacked at multiple stages, electric wave interference between upper and lower management pallets 30 is prevented.

Accordingly, the management pallet 30 can communicate with the non-contact IC tags 55 of the articles 51 loaded on itself but can not communicate with the non-contact IC tags 55 of the articles 51 loaded on another management pallet 30.

The management pallet 30 is internally mounted with a controller 32, a GPS apparatus 34, a standard wave receiver 35, the sensing devices 36 (first sensing device 36a, second sensing device 36b), and the IC tag readers/writers 37 (first IC tag reader/writer 37a, second tag reader/writer 37b) for communicating out of contact with the non-contact IC tag 55, as shown in FIG. 3.

The controller 32 is embedded in the center of the management pallet 30 to avoid a strong impact, because of the control circuit. The controller 32 may be accommodated within an openable or closable lid on a plane or bottom face of the management pallet 30 so as to be easily removed from the management pallet 30. In this case, since the controller 32 is easily taken out, the data of the controller 32 can be easily read.

The GPS apparatus 34 is provided centrally on the back face side of the management pallet 30.

The standard wave receiver 35 is provided centrally on the front face side of the management pallet 30.

The GPS apparatus 34, the standard wave receiver 35 and the mobile antenna 33 are provided on the circumferential face portion (front face portion and back face portion in this embodiment) of the management pallet 30 to prevent the loaded articles 51 from interfering with the radio communication, and prevent the failure due to stress when the articles are conveyed on the forklift 2.

The sensing devices 36 (36a, 36b) are disposed centrally on both the left and right side portions of the management pallet 30. With this disposition, the failure due to stress during the conveyance on the forklift 2 is prevented.

The IC tag readers/writers 37 (37a, 37b) are disposed centrally on both the left and right side portions of the management pallet 30. With this disposition, the failure due to stress during the conveyance on the forklift 2 is prevented.

Herein, the IC tag readers/writers 37 are bilaterally provided, in which the oscillation angle is set to about 30°, and the antenna output is adjusted so that the communicable distance may be a height of about 2 m upward from the management pallet 30, as shown in a front view of FIG. 4.

Thereby, the IC tag readers/writers 37 can communicate with the non-contact IC tag 55 above the management pallet 30 1.1 m square in a range of about 2 m in height and about 1.15 m in width.

With the above constitution, the management pallet 30 is internally mounted with the controller 32, the GPS antenna 33, the GPS apparatus 34, the standard wave receiver 35, the sensing devices 36, and IC tag readers/writers 37.

Each mounted component is disposed away from the upper and lower positions (especially upper position) of the fork bores 31 for the management pallet 30, and therefore is not broken even if the fork 2a of the forklift 2 is inserted into the fork bores 31 and the management pallet 30 loaded with the articles 51 is lifted.

Also, it is possible to securely communicate with the non-contact IC tag 55 pasted onto the article 51 laid in a predetermined range (specifically 2 m upper, 1.15 m in depth and width) above the management pallet 30.

Since a communication range 40 is set not to extend sideways of the management pallet 30, it is possible to securely communicate with only the non-contact IC tag 55 pasted on the article 51 on its own management pallet 30 even in a state where a plurality of management pallets 30 are arranged in parallel.

The communication range 40 is set to be about 2 m upper, and can cover a range where the management pallet 30 can be loaded, making it possible to communicate with the non-contact IC tags 55 of all the loaded articles 51 to such an extent that the cargo does not collapse.

Also, the uncommunicable area near the management pallet 30 can be suppressed small.

Figure 5:
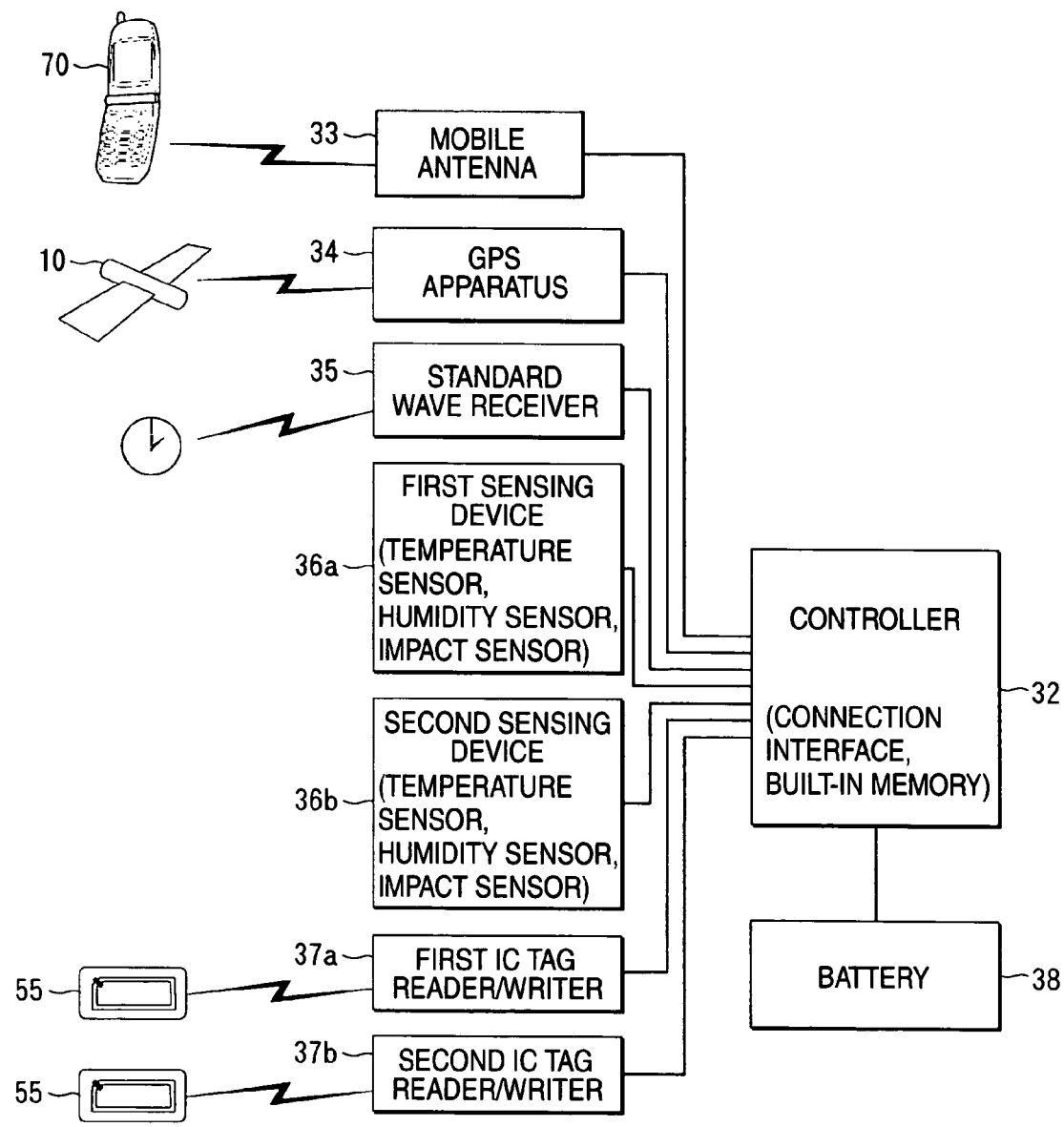
FIG. 5 are a block diagrams of the management pallet.

Referring to a block diagram of FIG. 5, the configuration of the management pallet 30 will be described below.

The management pallet 30 comprises the mobile antenna 33, the GPS apparatus 34, the standard wave receiver 35, the first sensing device 36a, the second sensing device 36b, the first IC tag reader/writer 37a, and the second IC tag reader/writer 37b, which are connected to the controller 32, and the battery 38 as a driving power source.

The controller 32 comprises a non-volatile memory inside, and controls each component and the storage of data into the non-volatile memory. The serial number, owner name, user name, use start date, and use end scheduled date of the management pallet 30 are written as the initial data into this non-volatile memory. When the management pallet 30 is passed to the user, other unnecessary data is deleted.

Also, the controller 32 comprises a connection interface with LAN or USB, and can communicate with the accumulation server 20 via the connection interface.

This connection interface may be wired or wireless. When it is wireless, it is desirable that the set frequency is different from the communication frequency of the mobile antenna 33 or the correspondence frequency of the IC tag reader/writer 37.

Also, the controller 32 has a Web server function of enabling the access to the controller 32 through the mobile antenna 33 from the portable telephone 70 in the same way as reading the home page at the portable telephone 70.

The access from the portable telephone 70 is made based on the portable telephone number set up in the controller 32 of the management pallet 30, but may be made with the ID or password.

The mobile antenna 33 has a communication frequency in a band of 800 MHz to 2 GHz to communicate with the base station (not shown) and communicate with the portable telephone 70 via the mobile communication network 60 (FIG. 1) under the control of the controller 32. To prevent radio interference with the IC tag reader/writer 37, it is desired that the communication frequency is set to 1 GHz or more.

The GPS apparatus 34 has a GPS antenna to communicate with the GPS satellite 10 to acquire the positional information under the control of the controller 32.

The standard wave receiver 35 receives the standard wave to acquire the time information under the control of the controller 32.

The first sensing device 36a and the second sensing device 36b are each composed of a temperature sensor, a humidity sensor and an impact sensor. The temperature measured by the temperature sensor and the humidity measured by the humidity sensor are transmitted to the controller 32 in accordance with a control signal from the controller 32.

Also, when the management pallet 30 undergoes an impact such as vibration or shock, the impact sensor senses this impact and sends it to the controller 32.

The first IC tag reader/writer 37a and the second IC tag reader/writer 37b comprise the IC and antenna coils; not shown. A tag ID (unique ID for every non-contact IC tag 55) is recorded beforehand in the non-volatile memory within the IC, and the data such as the kind of article, manufacture date and manufacturer are recorded before shipment to the physical distribution process.

Any one or both of the position data acquired by the GPS apparatus 34 and the time data acquired by the standard wave receiver 35 may be recorded along with these pieces of data before shipment to the physical distribution process. In this case, the time or position immediately before shipment to the physical distribution process may be left as a record.

The data is written or read into or from the non-contact IC tag 55 at a correspondence frequency in a UHF band from 850 MHz to 960 MHz in accordance with a control signal from the controller 32, in which the read data is transmitted to the controller 32. Similarly, the data indicating the section is read from the in-warehouse position transmission tag 5, in which the read data is transmitted to the controller 32.

Herein, the correspondence frequency is typically 13.56 MHz. However, since the articles are usually loaded up to the height of about 2 m, it is preferable to employ the correspondence frequency in the UHF band to communicate with the non-contact IC tag in a range of 2 m in height from the IC tag readers/writers 37.

The non-contact IC tag 55 comprises an antenna coil, parallel resonance circuits composed of the antenna coil and a condenser for resonance, a rectification circuit, a voltage detection circuit, a control circuit and a constant voltage circuit.

The non-contact IC tag 55 constituted in this way receives a command from IC tag reader/writer 37 via the antenna coil, in which the control circuit performs the processing based on the command, and responds to the IC tag reader/writer 37 via the antenna coil again.

The battery 38 is a chargeable power source unit, in which a sufficient quantity of electricity for the operation of the management pallet 30 for days of use is charged, when the management pallet 30 is passed to the user.

With the above constitution, the communication with the portable telephone 70, the communication with the GPS satellite 10, the reception of standard wave, the communication with the non-contact IC tag 55 and the acquisition of temperature, humidity and impact by the sensing devices 36 can be performed under the control of the controller 32, whereby the data can be stored in the memory of the controller 32.

For the IC tag reader/writer 37 to gain access to a plurality of non-contact IC tags 55 on the management pallet 30, it is preferable to perform a multiple tag access process typically called an anti-collision.

Figure 6:
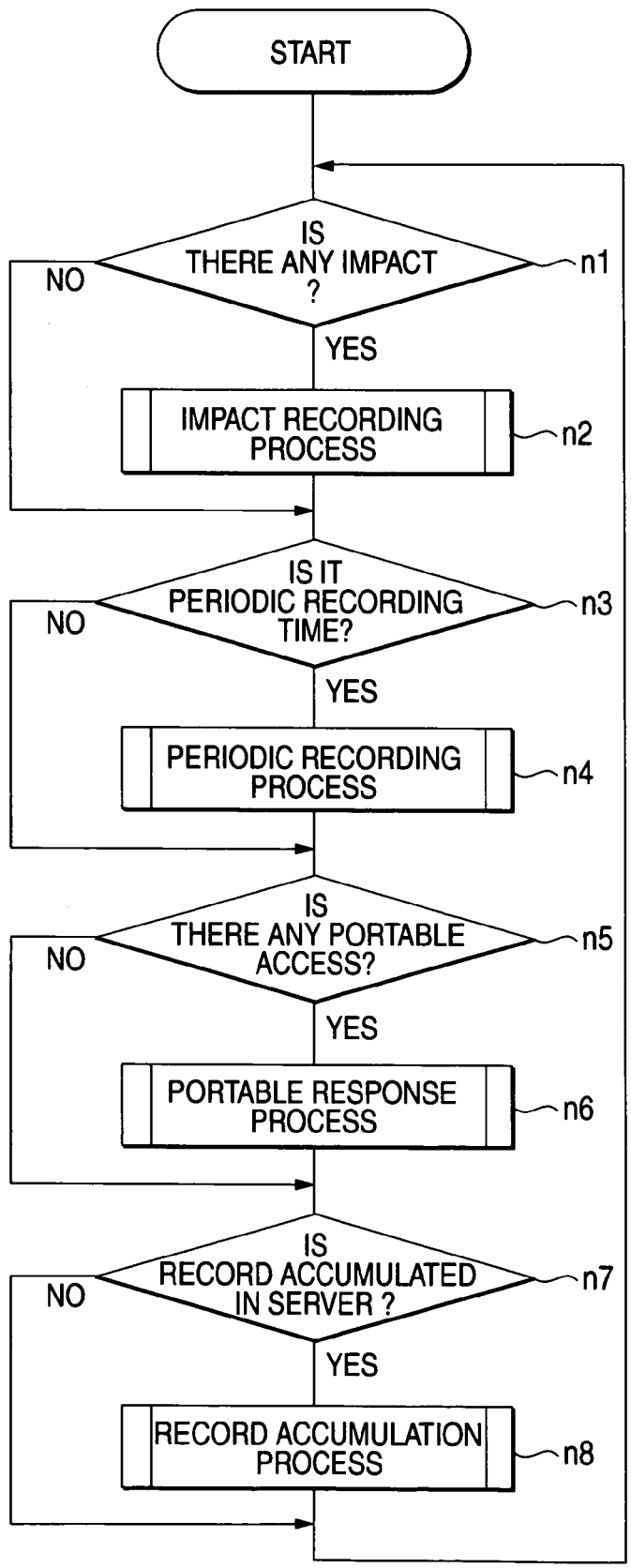
FIG. 6 is a flowchart of the overall process performed by a controller.

Referring to a flowchart of FIG. 6, the overall process of the controller 32 for the management pallet 30 will be described below.

If the management pallet 30 undergoes an impact such as vibration, collision or drop (step n1), the controller 32 performs an impact recording process (step n2).

If the standard time received by the standard wave receiver 35 becomes a preset periodic recording time (step n3), the controller 32 performs a periodic recording process (step n4).

If the access from the portable telephone 70 is received by the mobile antenna 33 (step n5), the controller 32 performs a portable response process (step n6).

If the accumulation server 20 is connected to the connection interface of the controller 32, and an accumulation instruction of accumulating the record is received (step n7), the controller 32 performs a recording accumulation process (step n8), whereby the procedure is ended.

The accumulation instruction may be appropriately issued by receiving a command signal from the accumulation server 20 connected, by depressing a proper switch, or by receiving a command signal from the portable telephone 70 via the mobile antenna 33.

With the above operation, when the preset operation condition such as impact, periodic recording time, access from the portable telephone 70 or reception of the accumulation instruction from the accumulation server 20 is satisfied, the required processing is performed.

Figure 7:
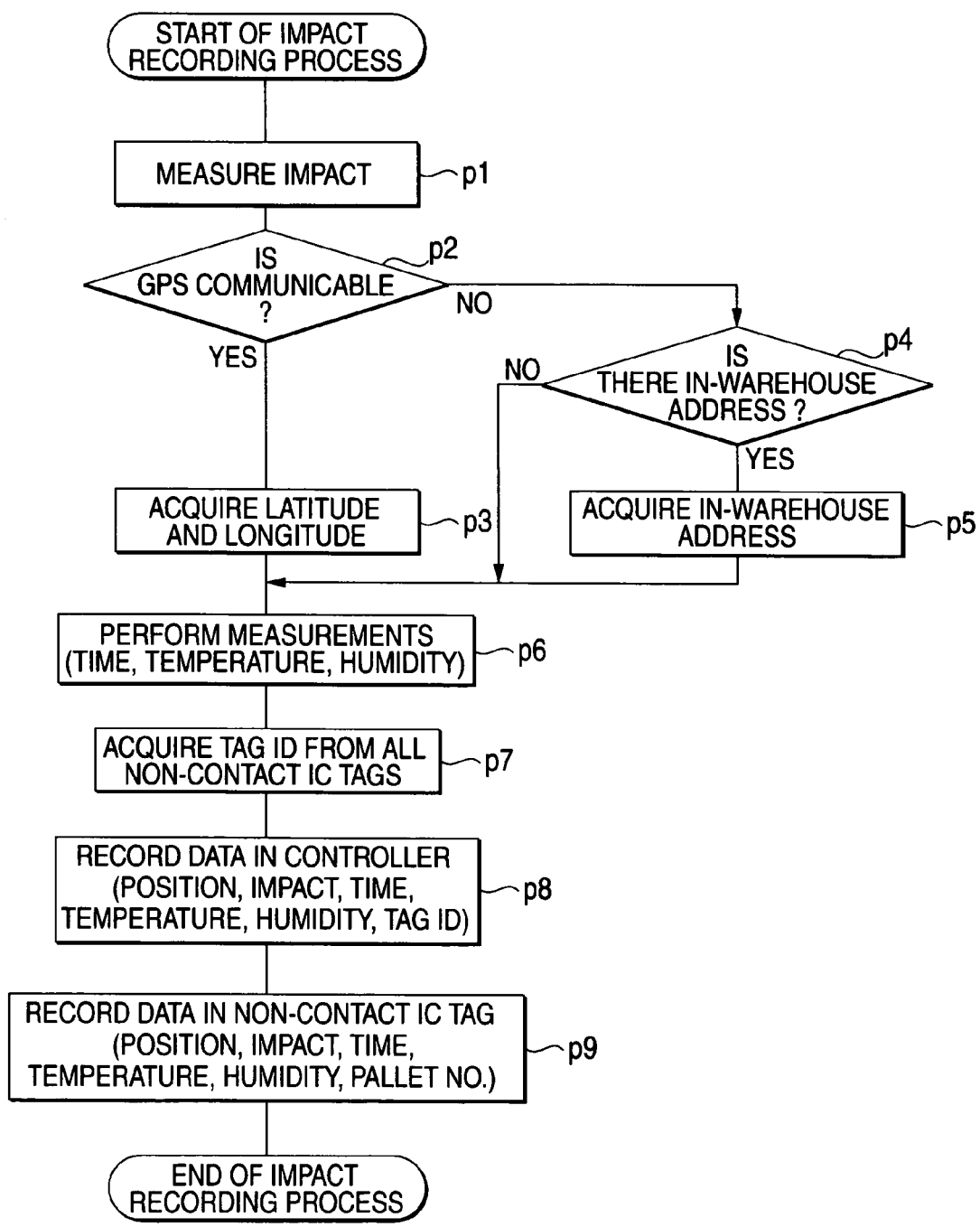
FIG. 7 is a flowchart of an impact recording process performed by the controller.

Referring to a flowchart of FIG. 7, the impact recording process of the controller 32 will be described below.

When an impact is sensed by the impact sensor of the sensing device 36, the controller 32 measures this impact (step p1).

If the GPS apparatus 34 can communicate with the GPS satellite 10 (step p2: YES), the latitude and longitude are acquired as the positional information (step p3).

If the GPS apparatus 34 is incommunicable with the GPS satellite 10 (step p2: NO), the IC tag reader/writer 37 attempts to communicate with the in-warehouse position transmission tag 5 to determine whether or not any in-warehouse address or section data exists in the communication range (step p4).

If the in-warehouse address exists (step p4: YES), the in-warehouse address is acquired as the positional information (step p5), and the procedure goes to step p6. If the in-warehouse address does not exist (step p4: NO), the procedure goes to step p6 in a state where the positional information can not be acquired.

The controller 32 performs the measurements for acquiring the current time (day, hour, minute) by the standard wave receiver 35, acquiring the current temperature by the temperature sensor by the sensing device 36 and acquiring the current humidity by the humidity sensor (step p6).

The controller 32 acquires the tag ID (serial number of the non-contact IC tag 55) from all the non-contact IC tags 55 for the articles loaded on its own management pallet 30 (step p7).

The controller 32 records the all the acquired tag IDs and the position, impact and time in the memory within the controller 32 (step p8).

The controller 32 records the position, impact, time, temperature, humidity and pallet number in the non-contact IC tag 55 (step p9), and the procedure is ended. The above pallet number is stored in the memory within the controller 32.

With the above operation, when the impact sensor of the sensing device 36 for the management pallet 30 senses an impact, this impact can be recorded in the non-contact IC tag 55 and the memory of the controller 32. Accordingly, the recipient of the article 51 can inspect the presence or absence of an impact by reading the data from the non-contact IC tag 55 or make collation with the data within the memory of the controller 32 to check whether or not the data concerning the impact is falsified.

Figure 8:
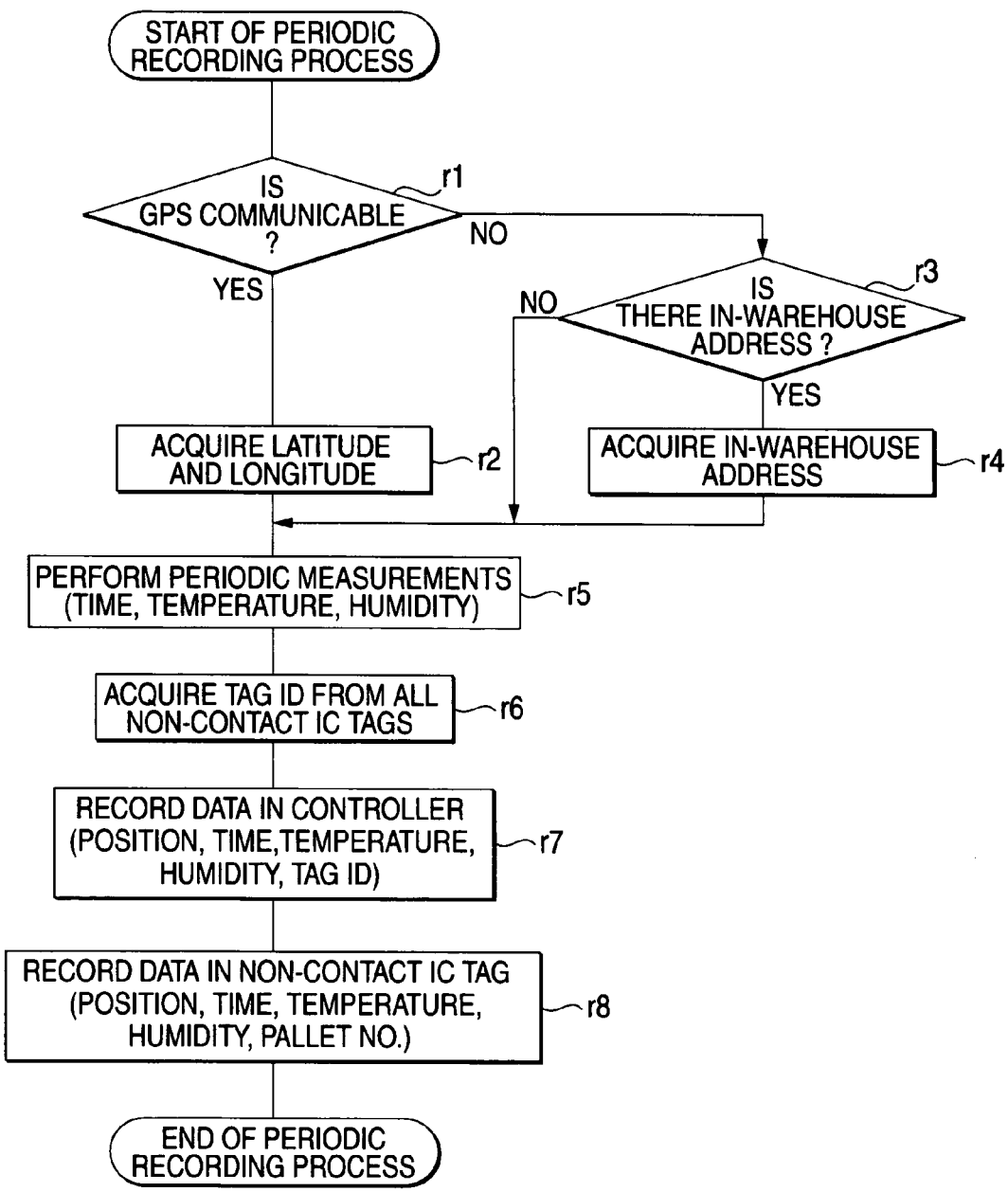
FIG. 8 is a flowchart of a periodic recording process performed by the controller.

Referring to a flowchart of FIG. 8, the periodic recording process of the controller 32 will be described below.

The periodic recording process performs the steps r1 to r8, which are the same as steps p2 to p9 in the impact recording process, except for steps r7 and r8.

At step r7, the data, except for the impact, recorded in the impact recording process, namely, position, time, temperature, humidity and tag ID are recorded as the data stored in the memory of the controller 32.

At step r8, the data, except for the impact, recorded in the impact recording process, namely, position, time, temperature, humidity and pallet number are recorded as the data stored in the non-contact IC tag 55.

With the above operation, the position, temperature and humidity with the time can be periodically recorded in the non-contact IC tag 55 and the controller 32. Accordingly, the progress in the situation of conveying the articles 51 loaded on the management pallet 30 can be recorded, whereby it is possible to confirm later whether the regular physical distribution route is followed, or the required temperature or humidity control is appropriately made.

If the data written in the non-contact IC tag 55 is read, the recipient can confirm the management situation of physical distribution or the physical distribution route and make collation with the controller 32 to prevent falsification.

The periodic recording intervals are preferably time intervals corresponding to the management conditions required for the articles 51 to be conveyed, such as a unit of 10 minutes, a unit of thirty minutes or a unit of one hour.

Figure 9:
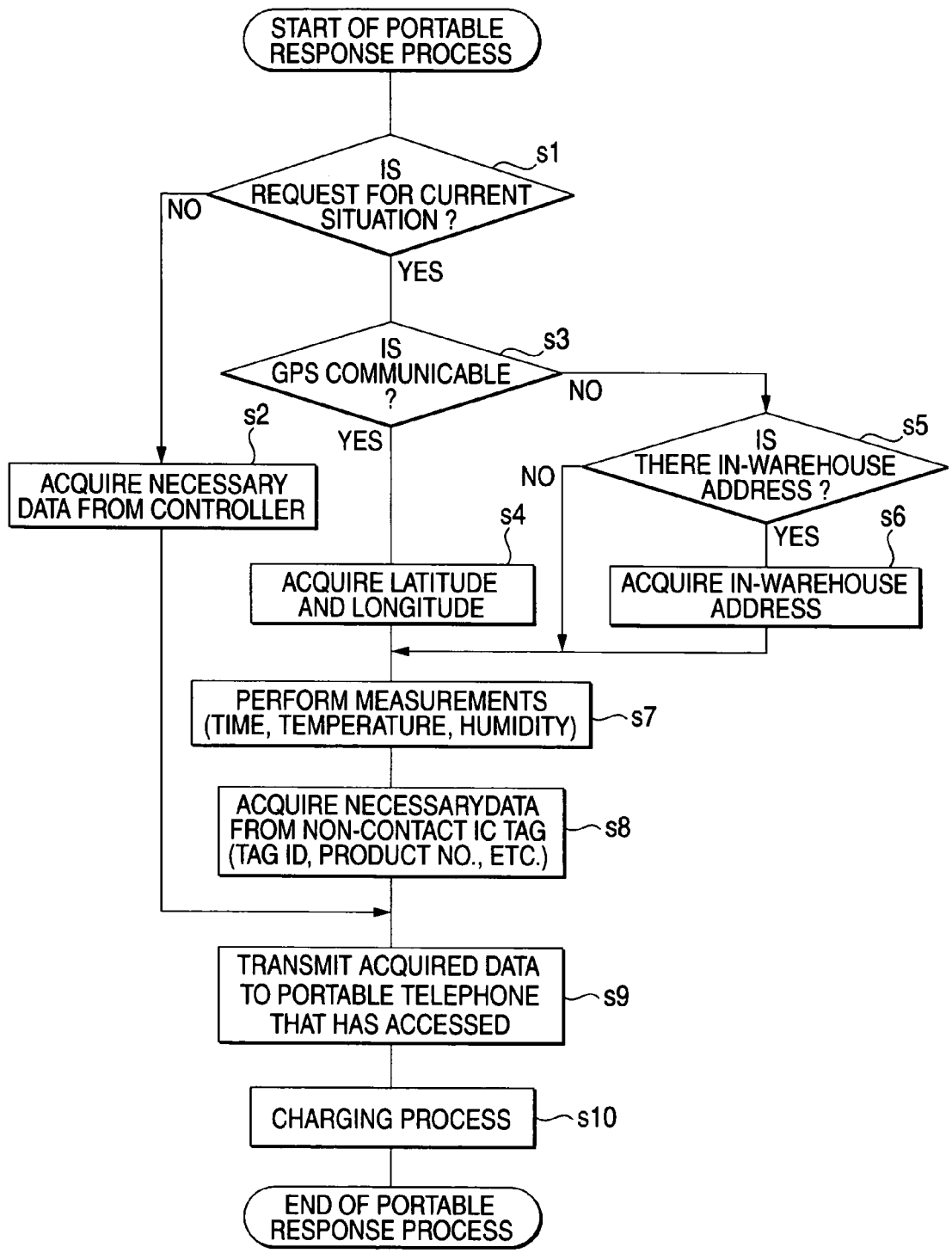
FIG. 9 is a flowchart of a portable response process performed by the controller.

Referring to a flowchart of FIG. 9, the portable response process of the controller 32 will be described below.

If the access content from the portable telephone 70 does not ask for the current situation at the present time (step s1: NO), the controller 32 acquires the required data (tag ID requested for reference to the portable telephone 70, product name, number of products, presence or absence of impact, temperature state, humidity state, etc.) from the memory (step s2), and the procedure goes to step s9.

If the current situation at the present time is requested (step s1: YES), the steps s3 to s7 are performed as the same process as the steps p2 to p6 of the impact recording process (steps s3 to s7).

The controller 32 reads the required data (tag ID requested for reference, product name, number of products, etc.) from the non-contact IC tag 55 (step s8).

If the required data is acquired, the acquired data is transmitted to the portable telephone 70 that has accessed (step s9), the portable telephone number of the portable telephone 70 is transmitted as the data required for charging to the charging server 75 (step s10), and the procedure is ended (step s10).

With the above operation, the user gains access to the management pallet 30 employing the portable telephone 70 to acquire the information concerning the loaded articles 51 and the current position.

Generally, the pallet loaded with the articles for transportation tends to be lost, and once lost, it is not clear at all where the pallet circulates in the physical distribution process, but if the positional information is acquired by gaining access to the management pallet 30 from the portable telephone 70, the current position can be specified and found.

Since the user can acquire the required data from a remote site, it is possible to confirm instantly to which site the articles 51 during transportation is transported at present, and whether or not the temperature is correctly controlled.

Since the charging server 75 charges when there is an access, the fee can be withdrawn by providing the management pallet 30.

Figure 10:
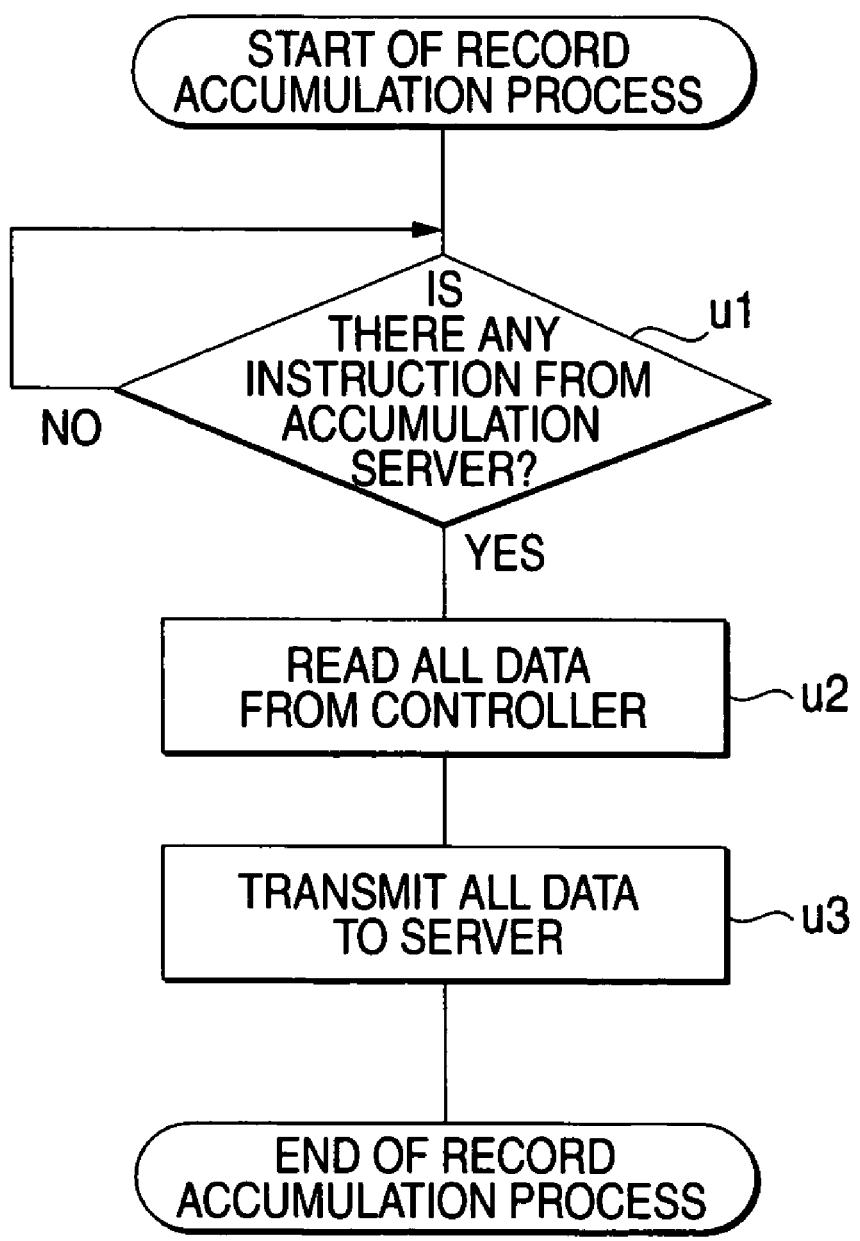
FIG. 10 is a flowchart of a recording accumulation process performed by the controller.

Referring to a flowchart of FIG. 10, the recording accumulation process of the controller 32 will be described below.

The controller 32 waits until a transfer instruction with a data transfer signal is received from the accumulation server 20, and if the transfer instruction is received (step u1), all the data is read from the internal memory (step u2).

The controller 32 transmits all the read data (position, time, temperature, humidity, impact and tag ID) to the accumulation server 20 (step u3).

With the above operation, all the data is transferred to the accumulation server 20. If the data of a plurality of management pallets 30 is transferred to the accumulation server 20, it is helpful for the physical distribution management.

This data, which can collectively manage the past records, is effectively utilized for various purposes such as assurance of physical distribution situation, improvement of physical distribution process, excretion monitoring of waste and traceability, other than the physical distribution management.

The data transferred to the accumulation server 20 may be left intact in the management pallet 30, but is preferably deleted at the time of transfer. Thereby, it is possible to prevent the duplication of data from being transferred multiple times.

With all the above operations, the data having the items (fields) of position, time, temperature, humidity, vibration and pallet number are additionally recorded and held as the physical distribution history in time series in the non-contact IC tag 55, as shown in a data explanatory diagram of FIG. 11.

Accordingly, the consignee of the article 51 can know the actual physical distribution process by only reading the data of the non-contact IC tag 55 (or non-contact IC tag 55 associated with the article 51 by trim or attachment) pasted to the article 51.

Specifically, from the data of the non-contact IC tag 55, the producer or carrier can be specified based on the information of latitude and longitude indicated by the records No. 1 to No. 8 in an illustrated example.

The article is firstly placed at the normal temperature (+25° C.) as indicated at record No. 1, but stored at a temperature of −10° C. for a certain period at records No. 4 to No. 6 and transported.

From the in-warehouse address of records No. 4 to No. 6, it can be found that the article was stored in the warehouse for a certain period. At this time, since the pallet number is changed at record No. 4, the article was reloaded from one management pallet 30 to another management pallet 30.

An impact is applied at record No. 6, in which the temperature rises to +10° C.

Finally, the article is reloaded on the original management pallet 30 at record No. 8, and placed in the normal temperature state (+30° C.).

Also, the data having the items (fields) of position, time, temperature, humidity, impact and tag ID are additionally recorded in time series and held as the physical distribution history in the memory within the controller 32, as shown in a data explanatory diagram of FIG. 12.

Accordingly, even when the data recorded in the non-contact IC tag 55 is falsified, it is possible to detect a falsification by making collation with the data within the controller 32.

Specifically, from the data within the controller 32, the producer or carrier can be specified based on the information of latitude and longitude indicated by the records No. 1 to No. 9 in an illustrated example. It can be found that the pallet is firstly placed at the normal temperature (+25° C.) as indicated at record No. 1, but is stored at a temperature of −10° C. for a certain period at records No. 2 to No. 8 and transported.

From record No. 3, it can be found that there was an access from the portable telephone, because the access position (latitude and longitude) and the access time are left as evidence.

As indicated at records No. 5 to No. 8, since the in-warehouse address is recorded where GPS wave is difficult to reach, it can be found that the pallet was stored in the warehouse. At this time, since the number of tag IDs is decreased at record No. 5, it can be found that the article 51 pasted with the non-contact IC tag 55 of the lost tag ID was extracted (unloaded) from this management pallet 30.

The number of tag IDs is increased at record No. 7, and this tag ID is not present so far, whereby the new article 51 is loaded. Thereby, the mixed loading, if any, can be appropriately managed.

Since the latitude and longitude are recorded again at record No. 9, the pallet is shipped from the warehouse and placed in the normal temperature state. Then, since one of the recorded tag IDs is changed to "AB-CDE", it can be found that the article 51 as the loaded product is reloaded at this time.

Figure 13:
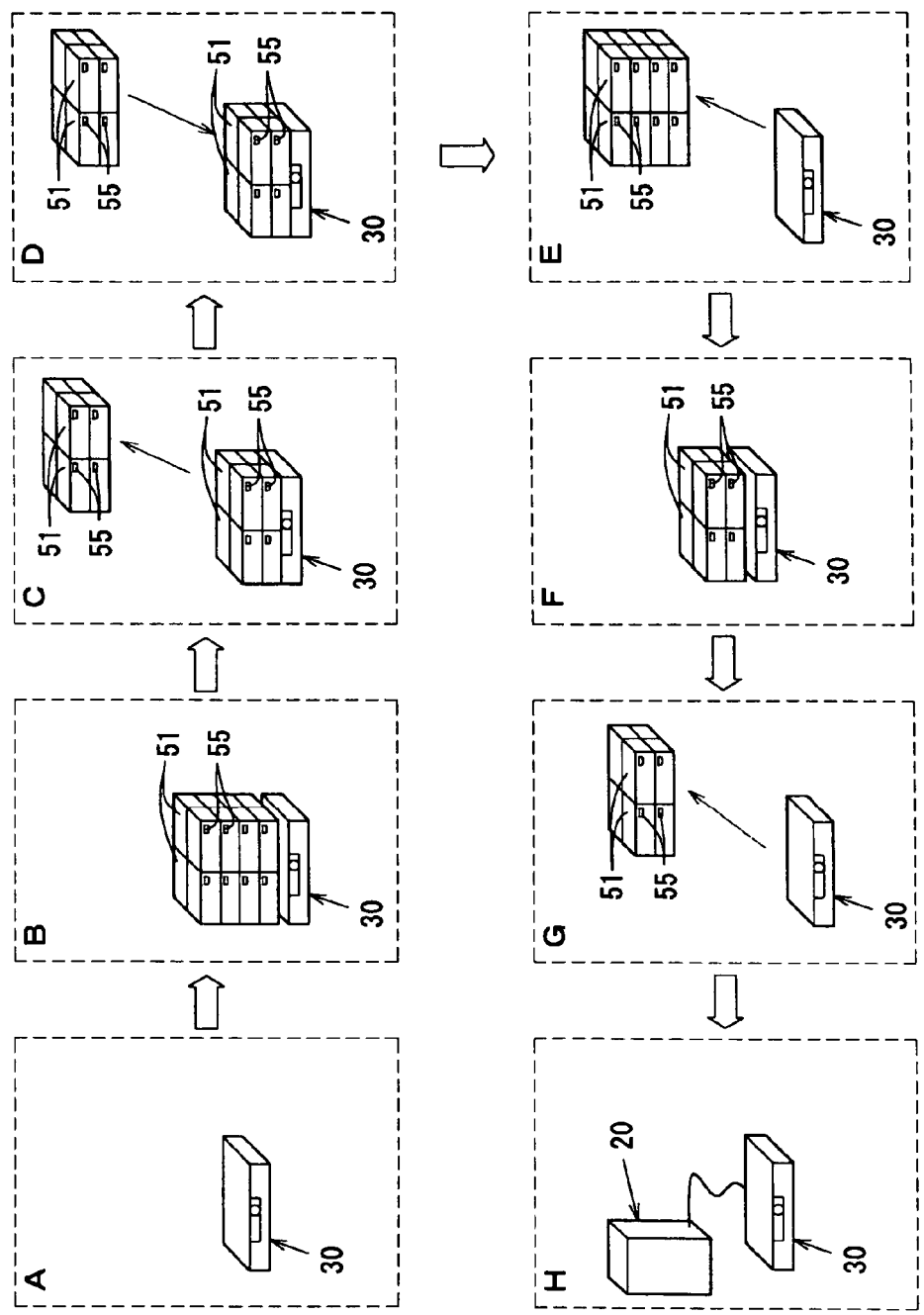
FIG. 13 is an explanatory view of a physical distribution system.

Since the data is recorded at each point of time in this way, it is possible to monitor the loading or unloading of the articles 51 on or from the management pallet 30 as indicated at A to H in an explanatory diagram of FIG. 13. Finally, the data is transmitted to the accumulation server 20 as indicated at H.

The data within the controller 32 can be acquired by the portable telephone 70 gaining access to the management pallet 30 via the mobile communication network 60. Therefore, as far as any data remains in the management pallet 30, it is possible to detect a falsification of data recorded in the non-contact IC tag 55 by making collation, even if the article 51 is unloaded and the management pallet 30 is already moved to another location.

If the data is transferred to the accumulation server 20 and no data remains in the management pallet 30, it is possible to detect a falsification of data recorded in the non-contact IC tag 55 by gaining access to the accumulation server 20 from appropriate terminal via the communication network such as the Internet for the collation.

In this way, it is possible to communicate with the non-contact IC tags 55 pasted on all the articles 51 on the management pallet 30, whereby the storage state such as extraction or consolidation of the article 51 on the management pallet 30 in the physical distribution process can be grasped minutely.

Since the extraction or addition of the article 51 on the management pallet 30 is automatically recorded in the memory within the controller 32, a manual operation error can be prevented, thereby increasing the reliability of management.

If a plurality of management pallets 30 are employed to transport all the articles 51 on the management pallets 30, the current information and the physical distribution history of all the articles 51 can be securely acquired, however the articles 51 are reloaded or mixed.

It is possible to make the location management of the articles 51 in the wide range or the minute storage state management of the articles 51, whether the management pallet 30 is located indoors such as in the warehouse, or outdoors.

The progress in the movement of position can be recorded in the wide range by the GPS, and the progress in the temperature and humidity during transportation or storage can be recorded. Therefore, much more detailed management and proof of the physical distribution process are made than where the articles are only managed at the time of going in or out of the warehouse.

Since the management pallet 30 having the IC tag reader/writer 37 circulates, it is unnecessary to have the IC tag reader/writer device at each physical distribution strongpoint, and invest in the IC tag reader/writer device.

Since the access to the management pallet 30 and the access to the non-contact IC tag 55 under the control of the management pallet 30 can be made by the portable telephone 70, each physical distribution strongpoint is employed without connection to the network. Accordingly, the equipment investment for network connection and the equipment investment for its security are not required.

Since it is unnecessary that the article 51 is passed through a conveyor type reader device or a gate type reader device, there are no restrictions on the path for carrying in or out the article 51, and the congestion of cargo is prevented.

Since the access to the management pallet 30 is enabled at any time by the portable telephone 70, the management pallet 30 is remotely controlled to acquire the data of current position, temperature, humidity and impact, whereby the current situation of the article 51 can be easily grasped.

The recipient can easily confirm whether or not all the ordered articles 51 are on board the management pallet 30 by communicating with the non-contact IC tag 55 through the IC tag reader/writer 37 of the management pallet 30 while the management pallet 30 is still loaded with the articles 51.

Since it is difficult to change the data in the memory of the controller 32, the data written in the non-contact IC tag 55 by the IC tag reader/writer 37 under the control of the controller 32 is highly reliable.

Also, since the data in the memory of the controller 32 and the data within the IC tag reader/writer 37 are completely coincident, it is possible to detect a falsification by collation with the data in the memory of the controller 32, when the data of the IC tag reader/writer 37 is falsified.

Since the data is copied and accumulated in the accumulation server 20 at the last time in the physical distribution process, it is possible to make the management of the physical distribution process, the assurance of the conveyance route physical distribution situation, the improvement of the physical distribution process, and the discharge monitoring of the waste from the accumulated data.

Though the packing material may be present as the waste, the waste data is automatically recorded in the memory of the controller 32, and utilized as the assets management data by the forwarder, or as the record data of the kind or amount of waste by the waste collector.

Since the position of the management pallet 30 can be tracked, even when the management pallet 30 is missing, the whereabouts of the management pallet 30 can be grasped if the portable telephone 70 gains access to the management pallet 30 to acquire the position data from the GPS apparatus 34 and return it.

If the service period of the management pallet 30 remains, the management pallet 30 is still employed, but may be employed separately in multiple physical distribution processes, such as the physical distribution process for returning or sending back the goods when the recipient returns the article 51 or sends back the packing material.

In the above embodiment, two or more IC tag readers/writers 37 may be provided, for example, one on each side face, four in total, on the periphery of the management pallet 30. Thereby, the communicable range can be set up more minutely. In this case, the GPS apparatus 34 or the sensing devices 36 may be disposed in the superfluous space.

Figure 14:
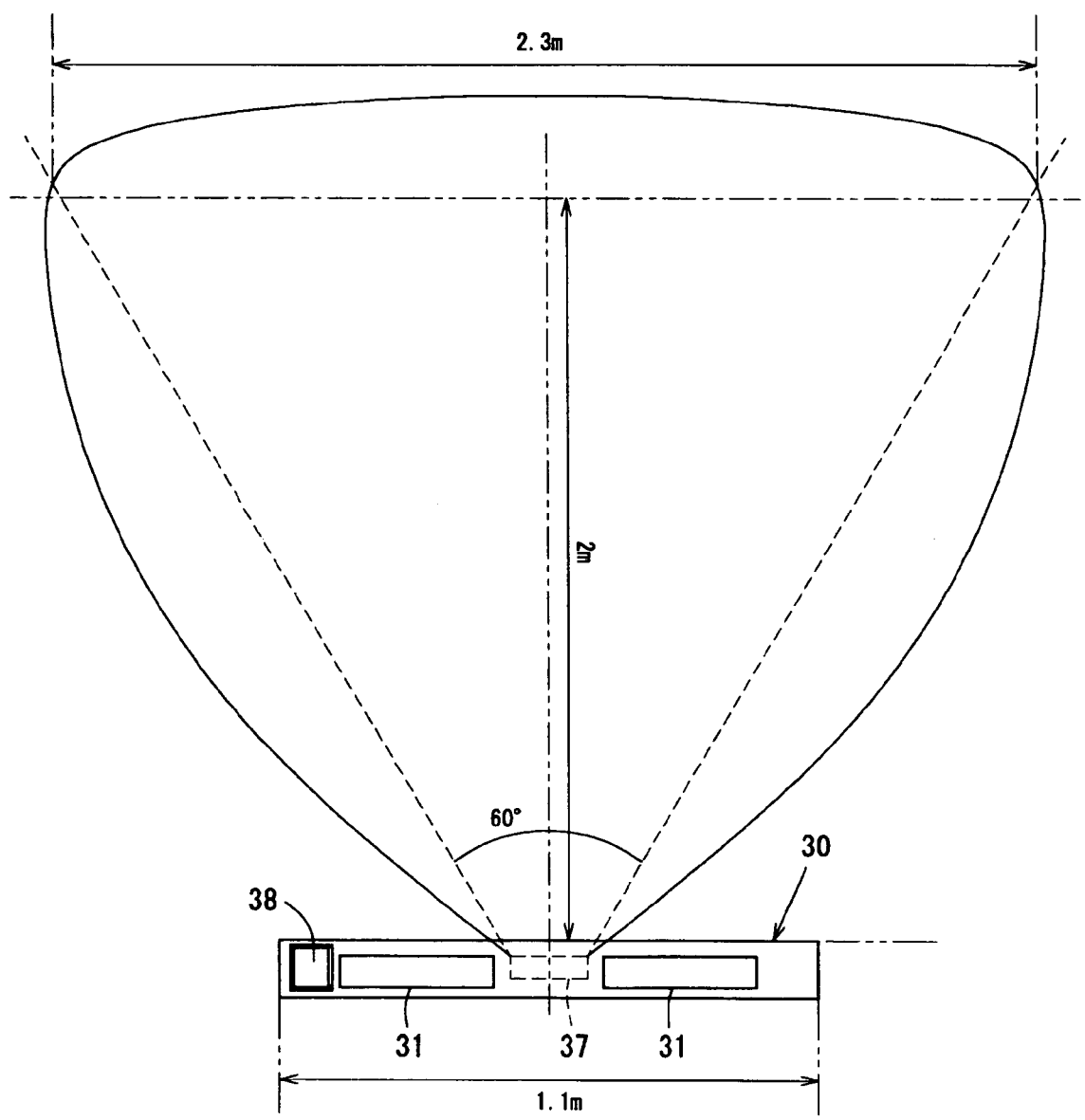
FIG. 14 is a front view for explaining the non-contact communication area of the management pallet according to another embodiment.

Also, one IC tag reader/writer 37 may be provided in a central portion of the management pallet 30 in plan view, as shown in FIG. 14 that is a front view of for explaining the non-contact communication area.

In this case, it is preferred that the oscillation angle of the IC tag reader/writer 37 is set to 60°, and the antenna output is adjusted so that the communicable distance may be a height of about 2 m upward from the management pallet 30.

Thereby, the communicable area width is 2.3 m, and the communicable area is larger by 0.6 m sideways of the management pallet 30 than the square of 1.1 m in the size of the management pallet 30.

In this case, there is a problem that if the management pallets 30 are adjacent, the non-contact IC tag 55 on the adjoining management pallet 30 is read. However, if the management pallets 30 are disposed not to be adjacent, or the management pallet 51 loaded with the articles 51 is totally covered with an appropriate electromagnetic shield member 45, the problem is solved.

The electromagnetic shield member 45 may be a film of electromagnetic shielding material such as a net formed from aluminum foil or metallic fiber.

Also, the mobile antenna 33 may communicate with a wireless LAN communicable over the long distance in a 5 GHz band. In this case, the Internet may be employed instead of the mobile communication network 60. Thereby, the communication cost is reduced.

Also, the access to the controller 32 from the outside may be made from other external terminals such as the personal computer, but not the portable telephone 70.

Figure 15:
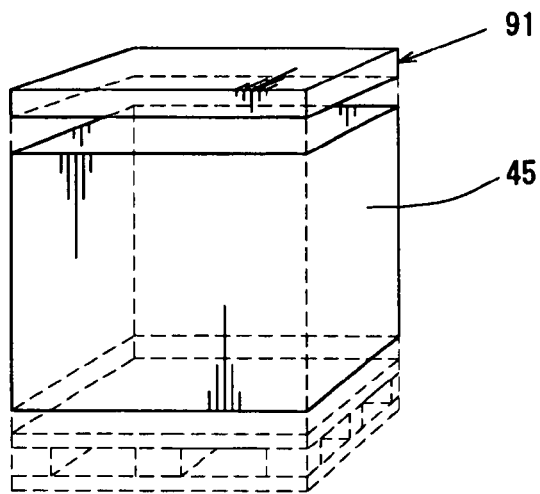
FIGS. 15(A) and 15(B) is an explanatory view for explaining a management roof and a management container according to another embodiment.
Figure 15:
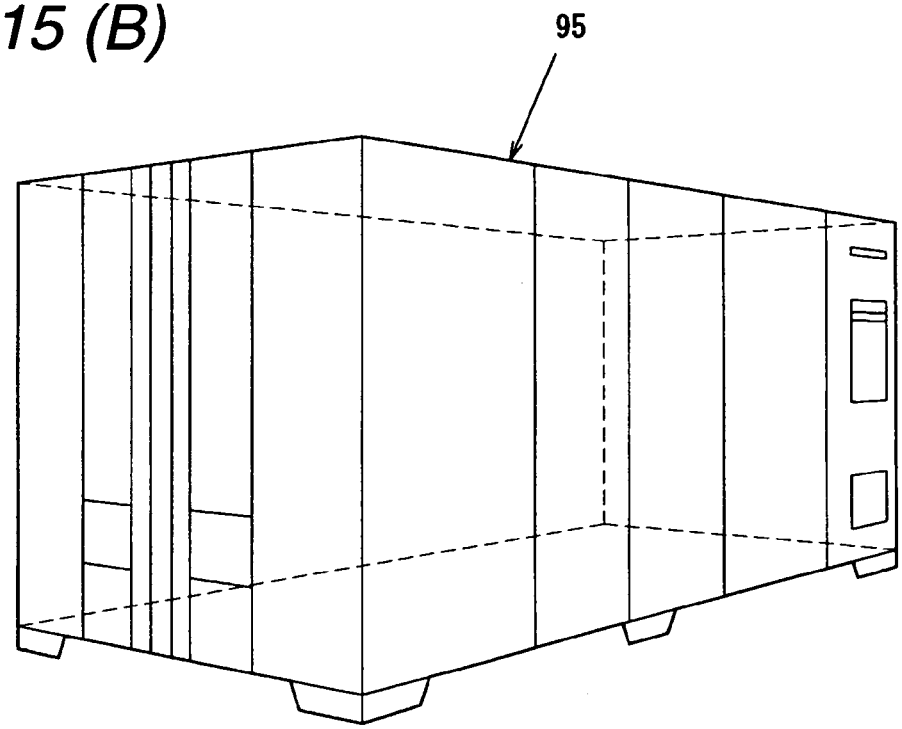
Figure 16:
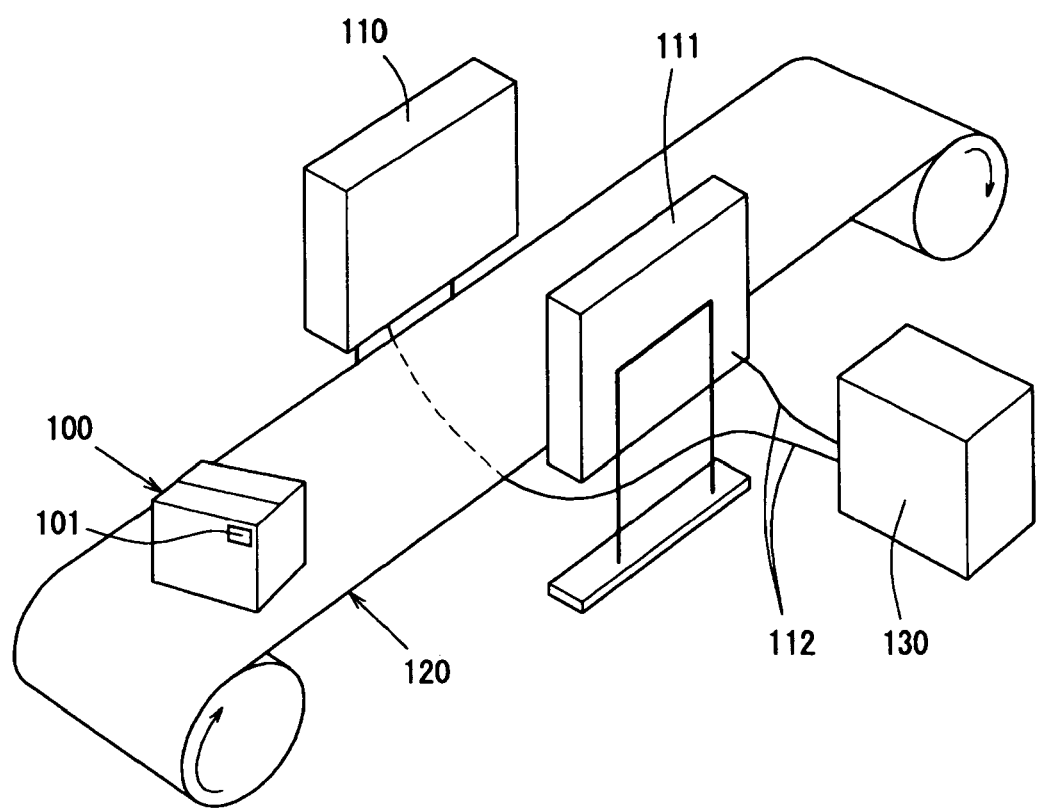
FIG. 16 is a perspective view of the related-art conveyor type reader device.
Figure 17:
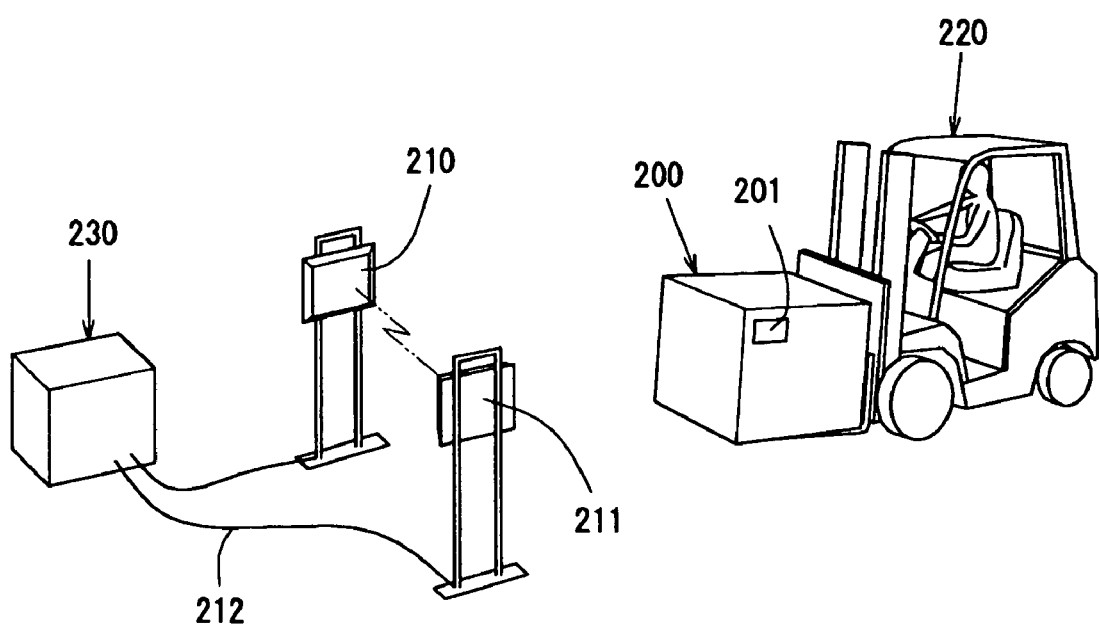
FIG. 17 is a perspective view of the related-art gate type reader device.
Figure 18:
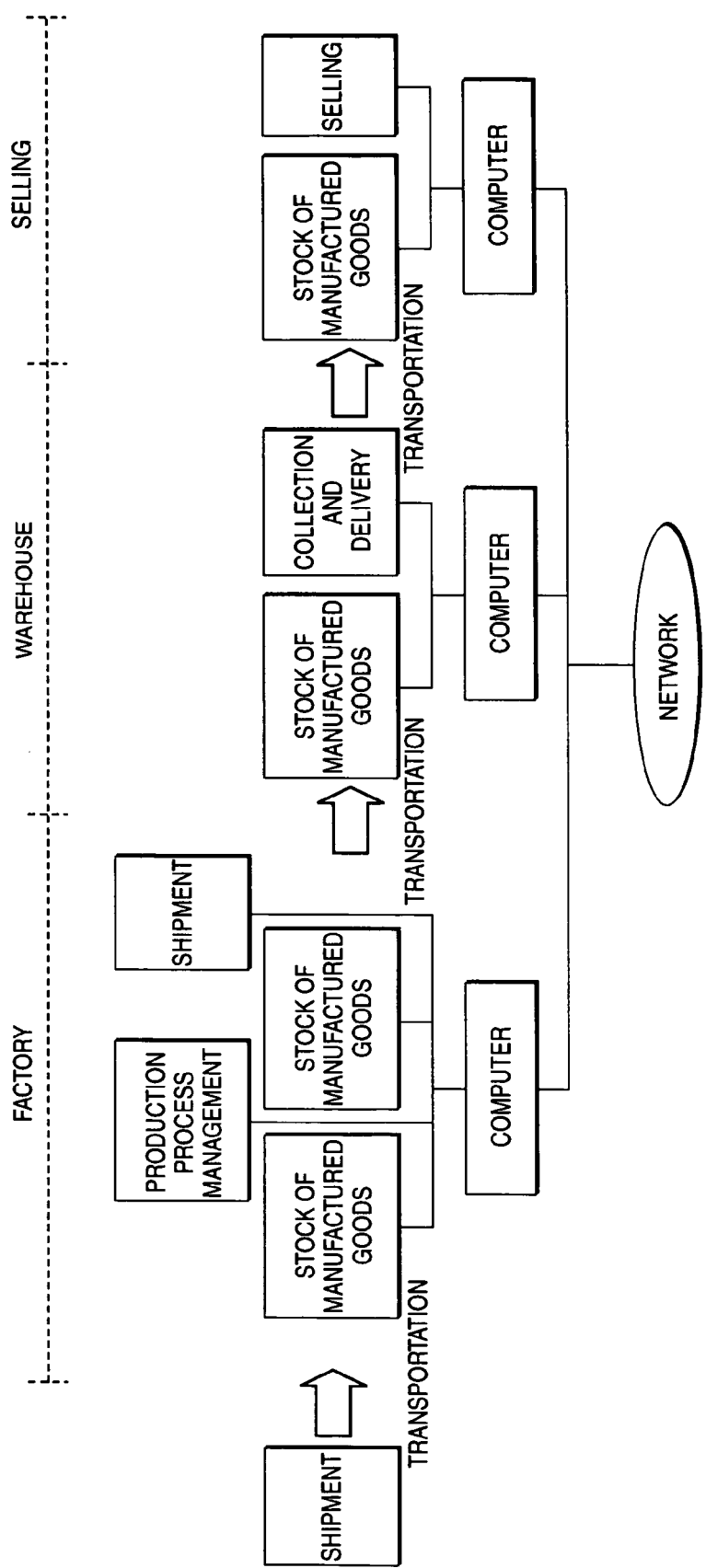
FIG. 18 is a system configuration diagram of the related-art physical distribution system.

Also, the management pallet 30 may be made from other materials useful for conveying the articles 51, and constituted as a management roof 91 laid on the articles loaded on the pallet, as shown in FIG. 15A, or a management container 95 formed like a box, as shown in FIG. 15B.

In this case, the management roof 91 or the management container 95 may be provided with the controller 32, the mobile antenna 33, the GPS apparatus 34, the standard wave receiver 35, the sensing devices 36, the IC tag readers/writers 37, the battery 38. Also, the electromagnetic shield member 45 may provided, as needed.

In the case of the management roof 91, it is preferred that the IC tag readers/writers 37 direct the communication range downward, and are disposed vertically symmetrical to the case of the management pallet 30. The electromagnetic shield member 45 should be wrapped around the side face of the article 51, as needed, to disable communication with the non-contact IC tag 55 of the article 51 placed adjacently. This electromagnetic shield member 45 may be also employed in the case of the management pallet 30.

In the case of the management container 95, it is preferred that the sensing device 36 and the IC tag reader/writer 37 are provided inside the container, and the mobile antenna 33, the GPS apparatus 34 and standard wave receiver 35 are provided outside the container.

Thereby, it is possible to acquire the temperature, humidity and impact where the article 51 is placed within the container and to appropriately communicate with the non-contact IC tag 55. Also, it is possible to appropriately communicate with the GPS satellite 10 and the mobile communication network 60 and to receive the standard wave appropriately.

With this constitution, it is possible to provide the physical distribution management system 1 that is not limited to the pallet but usable according to the form of conveying the articles in the physical distribution process, and employed by various conveyance methods.

If the apparatus having the components of the management pallet 30, but not the materials used for the physical distribution, is employed and conveyed along with a plurality of articles 51 in the communication range of the IC tag reader/writer 37, the same effect can be achieved.

Also, the standard wave receiver 35 is not provided but instead, a timer may be provided in the controller 32. In this case, the time is counted by the timer, and the periodic recording or measurement time recording can be made.

Also, the periodic recording may be made by receiving an instruction signal from the mobile antenna 33, but not when the time acquired by the standard wave receiver 35 becomes the preset time.

In this case, it is preferred that a recording instruction is issued manually from the portable telephone 70, or a recording instruction signal is periodically transmitted from the portable telephone 70 or other external terminals.

Thereby, the standard wave receiver 35 may be deleted from the system to reduce the cost.

Also, the in-warehouse position transmission tag 5 may not be provided within the warehouse to cause the IC tag reader/writer 37 to read the position from the in-warehouse position transmission tag 5 (steps p4 to p5, r3 to r4 and s5 to s6 are omitted).

Thereby, when it is unnecessary to grasp the position inside the warehouse, or it is possible to communicate with the GPS satellite 10 within the warehouse, the cost is reduced.

Even if the GPS communication is disabled within the warehouse, it is possible to suppose at which position the warehouse stores the pallet from the position where the GPS communication is enabled nearby.

Also, in the case where the management pallet 30 is employed only within one warehouse, the management pallet 30 may not be provided with the GPS apparatus 34, and the IC tag reader/writer 37 may communicate with the in-warehouse position transmission tag 5 to specify the in-warehouse position.

In this case, the GPS apparatus 34 may be omitted to reduce the cost, which is effectively utilized when the storage position of articles is to be managed within a wide warehouse.

Also, the management pallet 30 may not be provided with the sensing device 36. In this case, since the recording of the conveyance path or the current position is permitted, the suitable physical distribution process management can be implemented at low cost for the articles 51 not requiring the temperature management.

Also, the management pallet 30 may not be provided with the GPS apparatus 34. In this case, the temperature, humidity and impact can be recorded and grasped, and the environmental management in the physical distribution process can be implemented at low cost.

Also, the management pallet 30 may not be provided with the GPS apparatus 34, nor with the mobile antenna 33. Even in this case, the temperature, humidity and impact can be recorded, and the environmental proof in the physical distribution process is implemented at low cost.

Also, the non-contact IC tag for recipient where the recipient name or recipient ID is recorded is delivered to the recipient, and the recipient name or recipient ID is read by the IC tag reader/writer 37 at the time of reception, and recorded in the memory of the controller 32, along with the time and position, to assure the receipt of goods.

Thereby, it is possible to avoid a trouble concerning the presence or absence of receipt of goods.

Also, the strict prohibition of impact, designated temperature, designated humidity, do not turn over, other data or a combination of those data, may be recorded as the handling designation data in the non-contact IC tag 55. In this case, when the handling designation is disobeyed, the computer 32 may make a warning process.

The warning is made by outputting a buzzer or a warning voice from an audio output apparatus such as a speaker provided for the management pallet 30, or transmitting a mail to a prescribed address. The transmission destination of the warning at this time should be recorded in the non-contact IC tag 55.

Thereby, for the articles 51 such as perishable foods which are required to be stored at the temperature within a prescribed range, the transportation situation can be monitored in real time on the transportation request side or receiving side in transporting the articles 51.

Accordingly, it is possible to prevent beforehand a degraded quality from being noticed after arrival of the articles 51 and the plan at the next process from being collapsed. Also, the access to the management pallet 30 may be made from the portable telephone 70 immediately after receiving a warning, in which the warehouse or physical distributor is specified from the current position, contacted, and asked for immediate movement to the environment where the handling specification is satisfied, thereby suppressing the deterioration of the goods.

Also, providing that the management pallets 30 with the articles 51 loaded are stacked at multiple stages, the electromagnetic shield member 45 may be omitted to reduce the cost.

In the correspondence between the inventive configuration and the above embodiment, the physical distribution apparatus of this invention corresponds to the management pallets 30 (30a, 30b), the management roof 91 and the management container 95 of this embodiment.

In the same way, the control section corresponds to the controller 32, the storage section corresponds to the memory within the controller 32 and the memory within the IC of the non-contact IC tag 55, the external apparatus communication section corresponds to the mobile antenna 33, the information acquisition section corresponds to the GPS apparatus 34, the sensing devices 36 (36a, 36b), and the IC tag readers/writers 37 (37a, 37b), the positional information acquisition section corresponds to the GPS apparatus 34 and the IC tag readers/writers 37 (37a, 37b), the time recognition section corresponds to the standard wave receiver 35, the environmental information acquisition section corresponds to the sensing devices 36 (36a, 36b), the non-contact communication section corresponds to the IC tag readers/writers 37 (37a, 37b), the portable power source section corresponds to the battery 38, the communication line corresponds to the mobile communication network 60, the external apparatus corresponds to the portable telephone 70, the charging section corresponds to the charging server 75, the prescribed process corresponds to steps s1 to s8, the transmission of execution result corresponds to step s9, the non-contact IC tag possessed by the recipient corresponds to the non-contact IC tag for recipient, the ID information of the recipient corresponds to the recipient ID, and the information concerning the placed situation corresponds to the latitude and longitude, section, temperature, humidity, and the presence or absence of impact.

However, the invention is not limited to the configuration of the above embodiment, but numerous other modifications may be made thereto.

I claim:

1. A physical distribution management apparatus comprising:
    a non-contact communication section for communicating out of contact with a non-contact IC tag;
    an information acquisition section for acquiring the information concerning a situation where said physical distribution management apparatus is placed;
    a control section for writing the information acquired by said information acquisition section into at least one storage section, said at least one storage section configured to maintain a plurality of information being acquired by said information acquisition section at different times; and
    a portable power source section for supplying an electric power to each of said sections.

2. The physical distribution management apparatus according to claim 1, wherein said information acquisition section includes a positional information acquisition section for acquiring the current positional information.

3. The physical distribution management apparatus according to claim 2, wherein said positional information acquisition section is configured to acquiring the current positional information from a global positioning system.

4. The physical distribution management apparatus according to claim 3, wherein said positional information acquisition section is configured to acquire the current positional information from a location based transmission device.

5. The physical distribution management apparatus according to claim 2, wherein said positional information acquisition section is configured to acquiring the current positional information from a location based transmission device.

6. The physical distribution management apparatus according to claim 1, wherein said information acquisition section includes an environmental information acquisition section for acquiring the current environmental information.

7. The physical distribution management apparatus according to claim 1, wherein said at least one storage section includes a first storage section provided in said non-contact IC tag and a second storage section provided in said physical distribution management apparatus, and
wherein said control section writes the information acquired by said information acquisition section into the first storage section of said non-contact IC tag, and writes the information concerning said non-contact IC tag and the information acquired by said information acquisition section into the second storage section of said physical distribution management apparatus.

8. The physical distribution management apparatus according to claim 1, further comprising:
a time recognition section for recognizing the time, wherein the time at which said information is acquired is written along with said information.

9. The physical distribution management apparatus according to claim 1, further comprising:
a time recognition section for recognizing the time, wherein said non-contact communication section communicates with the non-contact IC tag in accordance with the preset time settings.

10. The physical distribution management apparatus according to claim 1, further comprising:
an external apparatus communication section for communicating with an external apparatus through a communication line, apart from said non-contact communication section, wherein when there is an access from said external apparatus, said physical distribution management apparatus performs a predetermined process based on an instruction signal received from said external apparatus, and enables said external apparatus communication section to transmit the result of executing said process to said external apparatus.

11. The physical distribution management apparatus according to claim 1, wherein the ID information of a consignee is read from the non-contact IC tag possessed by the consignee, and said ID information is written into said storage section.

12. The physical distribution management apparatus according to claim 11, further comprising:
a time recognition section for recognizing the time, wherein the receiving time acquired by said time recognition section and the information acquired by said information acquisition section are written along with the ID information of the consignee into said storage section.

13. A physical distribution conveyance member incorporating the physical distribution management apparatus according to claim 1, comprising:
a fork insertion portion for inserting a fork of a forklift from a lateral face;
wherein each of said sections of the physical distribution management apparatus is kept away from said fork insertion portion.

14. The physical distribution management apparatus according to claim 1, wherein said, wherein said physical distribution management apparatus is a conveyance pallet or container.

15. A physical distribution management system comprising:
a communication line for enabling the communications;
an external apparatus having a communication section for communicating via said communication line; and
a physical distribution management apparatus having an external apparatus communication section for communicating with said external apparatus via said communication line, a non-contact communication section for communicating .out of contact with a non-contact IC tag, a control section for performing-various control processes, and a portable power source section for supplying an electric power to each of said sections;
wherein when there is an access from said external apparatus, said physical distribution management apparatus performs a prescribed process based on an instruction signal received from said external apparatus, and enables said external apparatus communication section to transmit a tag information concerning said non-contact IC tag as the result of executing said process to said external apparatus.

16. The physical distribution management system according to claim 15, wherein said physical distribution management apparatus comprises an information acquisition section for acquiring the information concerning a situation where it is placed, in which the information acquired by said information acquisition section and the tag information are transmitted to said external apparatus by said external apparatus communication section.

17. The physical distribution management system according to claim 15, further comprising:
a charging section for charging said external apparatus for an access to said physical distribution management apparatus.

18. A physical distribution management apparatus comprising:
a non-contact communication section for communicating out of contact with a non-contact IC tag;
a time information section for acquiring time information;
an information acquisition section for acquiring the information concerning a situation where it is placed;
a control section for writing the information acquired by said information acquisition section into at least one storage section, said at least one storage section configured to maintain a plurality of information being acquired by said information acquisition section at different times, said control section configured to request said information concerning a situation in response to an event; and
a portable power source section for supplying an electric power to each of said sections.

19. The physical distribution management apparatus of claim 18, further comprising:
an impact sensor section for acquiring information regarding an impact event and providing said information regarding an impact to said control section,
wherein response to said information regarding an impact, said control section configured to request said information concerning a situation.

20. The physical distribution management apparatus of claim 18, wherein said control section is configured to periodically request said information concerning a situation.

21. The physical distribution management apparatus of claim 18, wherein said control section is configured in response to a request from an external communication device to provide at least some of said information stored in said at least one section to an external communication device, said control section for writing information about said request from said external communication device into said at least one storage section.

22. The physical distribution management apparatus of claim 18, wherein said control section is configured in response to a request from an external communication device to request said information concerning a situation and provide said information concerning a situation to said external communication device, said control section for writing information about said request from said external communication device into said at least one storage section.

23. The physical distribution management apparatus according to claim 18, wherein said, wherein said physical distribution management apparatus is a conveyance pallet or container.

* * * * *